(12) United States Patent
Ahmed et al.

(10) Patent No.: US 10,467,147 B1
(45) Date of Patent: Nov. 5, 2019

(54) PRECACHING UNLOCKABLE DATA ELEMENTS

(71) Applicant: Snap Inc., Venice, CA (US)

(72) Inventors: Samir Ahmed, Marina del Rey, CA (US); Amit Gaur, Los Angeles, CA (US); Yue Hu, Venice, CA (US); Manish Maheshwari, Los Altos, CA (US); Yang Wen, Venice, CA (US)

(73) Assignee: Snap Inc., Santa Monica, CA (US)

( * ) Notice: Subject to any disclaimer, the term of this patent is extended or adjusted under 35 U.S.C. 154(b) by 11 days.

(21) Appl. No.: 15/582,304

(22) Filed: Apr. 28, 2017

(51) Int. Cl.
*G06F 12/0895* (2016.01)
*G06F 3/0484* (2013.01)
*G06T 5/00* (2006.01)

(52) U.S. Cl.
CPC ...... *G06F 12/0895* (2013.01); *G06F 3/04845* (2013.01); *G06F 2212/60* (2013.01); *G06T 5/00* (2013.01)

(58) Field of Classification Search
CPC .............. G06F 3/00; G06F 3/06–0689; G06F 5/00–16; G06F 9/00–548; G06F 11/00–3696; G06F 12/00–16; G06F 13/00–4295; G06F 17/00–5095; G06F 21/00–88; G06F 2003/0691–0698; G06F 2009/3883; G06F 2009/45562–45595; G06F 2206/00–20; G06F 2211/00–902; G06F 2212/00–7211; G06F 2213/00–4004; G06F 2216/00–17; G06F 2221/00–2153; G11C 15/00–06; G11C 16/00–3495
See application file for complete search history.

(56) References Cited

U.S. PATENT DOCUMENTS

| 6,038,295 | A | 3/2000 | Mattes |
| 6,980,909 | B2 * | 12/2005 | Root ...................... G01W 1/00 702/3 |
| 7,173,651 | B1 | 2/2007 | Knowles |

(Continued)

FOREIGN PATENT DOCUMENTS

CA 2887596 A1 7/2015

OTHER PUBLICATIONS

Enabling Mobile Phones to Support Large-Scale Museum Guidance; Bruns et al; IEEE Muktimedia, vol. 14, iss. 2, pp. 16-25; Apr. 23, 2007 (Year: 2007).*

(Continued)

*Primary Examiner* — Daniel C. Chappell
(74) *Attorney, Agent, or Firm* — Schwegman Lundberg & Woessner, P.A.

(57) ABSTRACT

Systems, devices, media, and methods are presented for selectively partitioning and precaching data elements. The systems and methods identify a device context for a client device and identify a cell based on the device context. The cell is associated with one or more partition characteristics and a plurality of data elements stored in a precache of data elements. The systems and methods select a set of data elements corresponding to the cell and at least a portion of the one or more partition characteristics. The systems and methods then retrieve the selected set of data elements from the precache of data elements and cause presentation of at least one data element of the selected set of data elements at a display device coupled to the client device.

20 Claims, 10 Drawing Sheets

(56) References Cited

U.S. PATENT DOCUMENTS

| | | | |
|---|---|---|---|
| 7,411,493 B2* | 8/2008 | Smith | H04W 4/02 340/539.11 |
| 7,535,890 B2 | 5/2009 | Rojas | |
| 8,073,565 B2* | 12/2011 | Johnson | H04W 76/11 700/245 |
| 8,131,597 B2 | 3/2012 | Hudetz | |
| 8,199,747 B2 | 6/2012 | Rojas et al. | |
| 8,332,475 B2* | 12/2012 | Rosen | H04L 51/36 709/206 |
| 8,385,971 B2* | 2/2013 | Rhoads | G06K 9/6253 455/556.1 |
| 8,666,989 B1* | 3/2014 | Gilliam | G06Q 30/0251 705/14.1 |
| 8,718,333 B2* | 5/2014 | Wolf | G06K 9/42 340/5.52 |
| 8,724,622 B2 | 5/2014 | Rojas | |
| 8,849,259 B2* | 9/2014 | Rhoads | G06K 9/6253 455/414.1 |
| 8,855,712 B2* | 10/2014 | Lord | G06K 9/6253 455/556.1 |
| 8,874,677 B2 | 10/2014 | Rosen et al. | |
| 8,909,679 B2 | 12/2014 | Roote et al. | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,191,776 B2 | 11/2015 | Root et al. | |
| 9,204,252 B2 | 12/2015 | Root | |
| 9,268,562 B1* | 2/2016 | Mangtani | G06F 8/71 |
| 9,443,227 B2 | 9/2016 | Evans et al. | |
| 9,489,661 B2 | 11/2016 | Evans et al. | |
| 9,491,134 B2 | 11/2016 | Rosen et al. | |
| 9,692,984 B2* | 6/2017 | Lord | G06K 9/00993 |
| 9,785,566 B2* | 10/2017 | Kurokawa | G06F 12/0875 |
| 2005/0138373 A1* | 6/2005 | Clark | G06F 21/31 713/166 |
| 2007/0189181 A1* | 8/2007 | Kirk | G01S 19/14 370/252 |
| 2007/0285240 A1* | 12/2007 | Sensenig | G06Q 10/08 340/572.1 |
| 2011/0066366 A1* | 3/2011 | Ellanti | G01C 21/3438 701/533 |
| 2011/0202598 A1 | 8/2011 | Evans et al. | |
| 2012/0209924 A1 | 8/2012 | Evans et al. | |
| 2014/0357312 A1* | 12/2014 | Davis | G06F 3/04842 455/550.1 |
| 2017/0237897 A1* | 8/2017 | Sivan | H04N 19/597 348/47 |

OTHER PUBLICATIONS

Location based advertisement publishing by using Wi-Fi and QR codes; Virulkar et al.; 2015 International Conference on Green Computing and Internet of Things; Oct. 8-10, 2015 (Year: 2015).*

SPLASH: Perspectives on Mobile Socializing, Playing and Content Sharing; Razikin et al.; 2011 Eighth International Conference on Information Technology: New Generations; Apr. 11-13, 2011 (Year: 2011).*

Location-dependent content-based image retrieval system based on a P2P mobile agent framework; Ariyoshi et al.; 2013 IEEE International Conference on Pervasive Computing and Communications Workshops; Mar. 18-22, 2013 (Year: 2013).*

Exploring Cultural Heritage in Augmented Reality with GoFind!; Sauter et al.; 2018 IEEE International Conference on Artificial Intelligence and Virtual Reality; Dec. 10-12, 2018 (Year: 2018).*

Mixed Reality-Aware Service Architecture for Mobile Environments; Dominguez et al.; Sixth International Conference on Innovative Mobile and Internet Services in Ubiquitous Computing; Jul. 4-6, 2012 (Year: 2012).*

Real-time face verification system on a cell-phone using advanced correlation filters; Ng et al.; Fourth IEEE Workshop on Automatic Identification Advanced Technologies; Oct. 17-18, 2005 (Year: 2005).*

Mobile augmented reality in the data center; Deffeyes, S.; IBM Journal of Research and Development, vol. 55, iss. 5, pp. 5.1-5.5; Oct. 2011 (Year: 2011).*

Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.

* cited by examiner

US 10,467,147 B1

PRECACHING UNLOCKABLE DATA ELEMENTS

TECHNICAL FIELD

Embodiments of the present disclosure relate generally to selectively precaching data elements. More particularly, but not by way of limitation, the present disclosure addresses systems and methods for partitioning geographic areas and data elements among the partitions of the geographic areas and selectively precaching portions of the data elements.

BACKGROUND

Telecommunications applications and devices can provide communication between multiple users using a variety of media, such as text, images, sound recordings, and/or video recording. For example, video conferencing allows two or more individuals to communicate with each other using a combination of software applications, telecommunications devices, and a telecommunications network. Telecommunications devices may also record video streams to transmit as messages across a telecommunications network. Such devices may incorporate information or program elements retrieved from remote servers and incorporated into telecommunications applications executed on the devices. Variations in network connectivity, data storage capacity, and release schedules for information or program elements introduce difficulties in device and application operations.

BRIEF DESCRIPTION OF THE DRAWINGS

Various ones of the appended drawings merely illustrate example embodiments of the present disclosure and should not be considered as limiting its scope.

Figure 1:
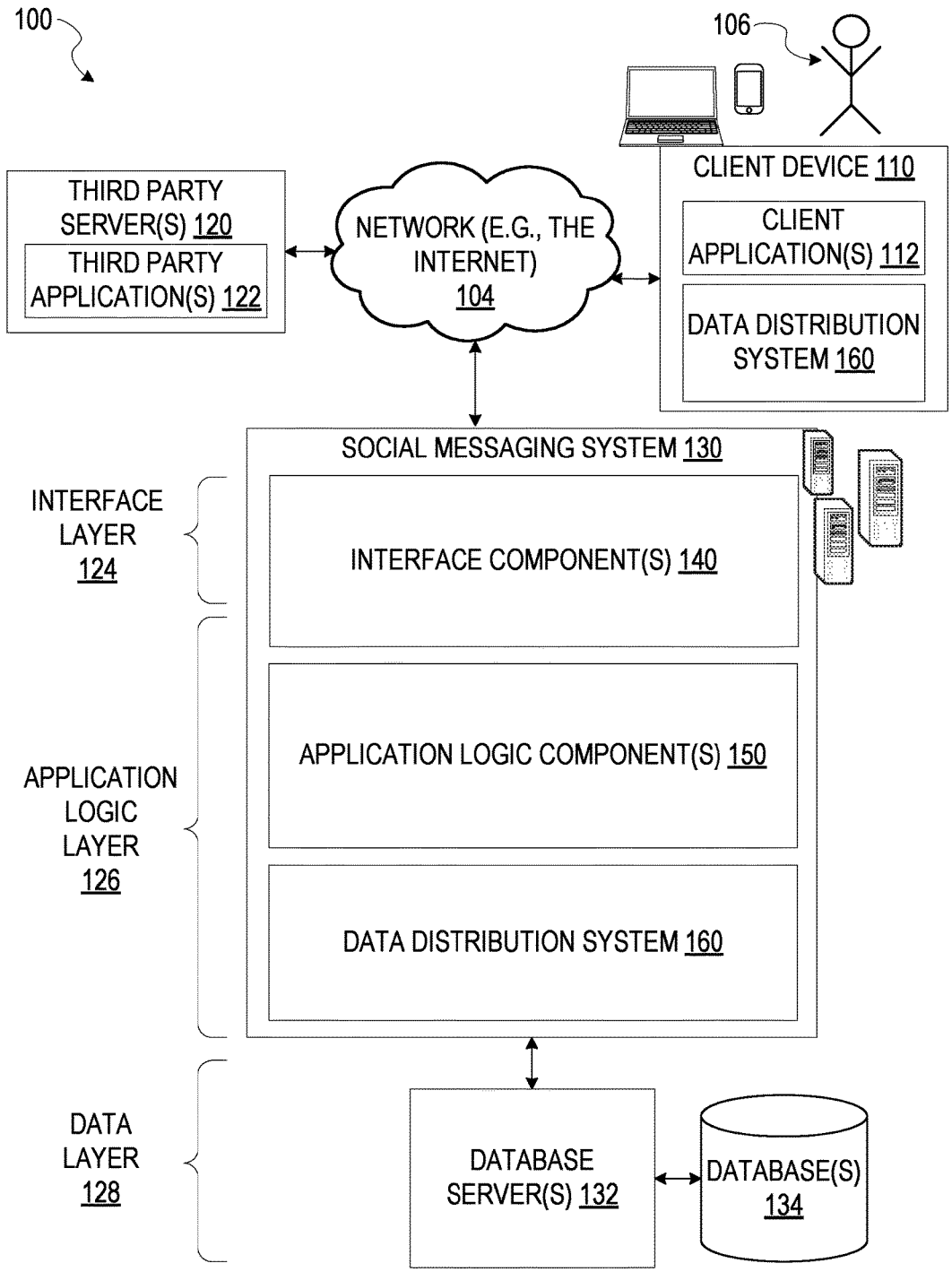
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In some embodiments, a user of a social network opens an application on a mobile computing device. Upon opening, the application determines operating conditions for the mobile computing device, such as a time and a location. Using the operating conditions, the application checks data elements stored on the mobile computing device. The data elements may be unlockable filters for modifying images or video captured by the mobile computing device. The filters may be understood as image, video, or presentation filters modifying one or more aspects of an image, a video stream, or a graphical user interface during capture or presentation of the respective image, video stream, or graphical user interface. The filters may be unlockable based on device contexts or other aspects described herein and may enable selective customization of a graphical user interface or an image capture device based on contextual or other aspects of the mobile computing device. The application may determine whether the filters are valid, and display the filters on the mobile computing device within the application. Where the filters, or a portion of the filters, are invalid or expired, the application may download and replace the filters with new filters based on the operating conditions of the mobile computing device. Where the application determines that filters are invalid, or no filters are downloaded onto the mobile computing device, the application may precache filters. Precaching of data elements (e.g., filters) may be performed by the application to provide or preload unlockable data elements (e.g., metadata or asset data) in a mobile computing device, so that the data elements can be used in situations of bad or no network conditions. As such, retrieval of data elements may avoid latency and availability limitations. Precaching may be understood as loading filters prior to use or selection of the filters and in anticipation of the use of such filters.

In some instances, the filters may be precached using one or more dimensions. For example, the application may precache filters using two dimensions, such as time and location. In such examples, the application may precache filters a specified amount of time ahead of an activation time (e.g., a time at which the filters are scheduled to be available for use), or a specified distance (e.g., feet, meters, miles, or kilometers) away from a specified location (e.g., a set of coordinates, a location, an area, or a geofence).

The unlockable data elements (e.g., filters) may be unlocked using queries to a database or social messaging system. The queries may be live queries including location or other information related to data or metadata for the unlockable data elements. The query may be followed by a download call for a portion of assets (e.g., the unlockable data elements) available for download from the database or social messaging system. In some embodiments, the application generates a precache framework to selectively retrieve certain unlockable data elements or types of unlockable data elements (e.g., geofilters, geolenses, augmented reality lenses, or geostickers). In some embodiments, the application may rely on precached data to serve unlockable data elements from the database or social messaging system. The application may selectively use live fetching of data for handling expired data elements (e.g., stale, expired, marked inactive, visibility change, limit condition change, or invalid precached data elements) or no precached data elements.

The above is one specific example. The various embodiments of the present disclosure relate to devices and instructions by one or more processors of a device (e.g., client devices, mobile computing devices, or network assets) to selectively partition and precache data elements at a mobile computing device, such as a client device. Although described with respect to specified or example embodiments, it should be understood that the concepts, systems, and methods described herein may comprise any one or any combination of embodiments described herein, without limitation.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each component or engine shown in FIG. 1 represents a set of executable software instructions and the corresponding hardware (e.g., memory and processor) for executing the instructions, forming a hardware-implemented component or engine and acting, at the time of the execution of instructions, as a special purpose machine configured to carry out a particular set of functions. To avoid obscuring the inventive subject matter with unnecessary detail, various functional components and engines that are not germane to conveying an understanding of the inventive subject matter have been omitted from FIG. 1. Of course, additional functional components and engines may be used with a social messaging system, such as that illustrated in FIG. 1, to facilitate additional functionality that is not specifically described herein. Furthermore, the various functional components and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface component(s) (e.g., a web server) 140, which receives requests from various client-computing devices and servers, such as client device 110 executing client application(s) 112, and third party server(s) 120 executing third party application(s) 122. In response to received requests, the interface component(s) 140 communicates appropriate responses to requesting devices via a network 104. For example, the interface component(s) 140 can receive requests such as Hypertext Transfer Protocol (HTTP) requests, or other web-based, Application Programming Interface (API) requests.

The client device 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client device 110 forms all or part of a data distribution system 160 such that components of the data distribution system 160 configure the client device 110 to perform a specific set of functions with respect to operations of the data distribution system 160. For example, in some embodiments, certain functionality of the data distribution system 160 is associated with components stored on the client device 110 (e.g., client-side functionality) and certain functionality of the data distribution system 160 is associated with components stored on the social messaging system 130 (e.g., server-side functionality).

In an example, the client device 110 is executing the client application(s) 112. The client application(s) 112 can provide functionality to present information to a user 106 and communicate via the network 104 to exchange information with the social messaging system 130. Further, in some examples, the client device 110 executes functionality of the data distribution system 160 to selectively partition and precache data elements at a client device (e.g., a mobile computing device or the client device 110). The data distribution system 160 enables selection and retrieval of discrete data elements or groups of data elements to generate a precache of data elements for later use by the client device. In some embodiments, the later use of at least a portion of the precache of data elements may be based on a device context, a time, a location, or any other suitable information configured as a condition or permission for release or access of the data elements. The data distribution system 160 also enables refresh of a previously generated precache of data elements. Refresh operations may be based on predetermined or dynamic times or time periods; predetermined or dynamic locations, areas, ranges, or proximities; expiration conditions; or any other suitable information satisfying a refresh condition. Expiration conditions may be related to time, location, or any other suitable information. For example, an expiration condition may comprise one or more of a time of download, a time since download exceeding a time threshold, an oldest download, a location for a data element, a distance from a data element location and a current location, or any other suitable information.

Each client device 110 can comprise a computing device that includes at least a display and communication capabilities with the network 104 to access the social messaging system 130, other client devices, and third party server(s) 120. Client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client device 110. In some embodiments, the user 106 interacts with the social messaging system 130 via the client device 110. The user 106 may not be part of the networked system 100, but may be associated with the client devices 110.

As shown in FIG. 1, the data layer 128 has database server(s) 132 that facilitate access to information storage repositories or database(s) 134. The database(s) 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic components 150, which, in conjunction with the interface component(s) 140, generate various user interfaces with data retrieved from various data sources or data services in the data layer 128. Individual application logic components 150 may be used to implement the functionality associated with various applications, services, and features of the social messaging system 130. For instance, a social messaging application can be implemented with at least a portion of the application logic components 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic components 150.

As illustrated in FIG. 1, the social messaging system 130 may include at least a portion of the data distribution system 160 capable of selectively partitioning and precaching data elements at a client device, according to various example embodiments. The data distribution system 160 may enable transfer or copy of data elements stored on the social messaging system 130 to the client device to generate a precache of data elements. The data distribution system 160 may also enable periodic updating or refreshing of a previously generated precache of data elements by retrieving new or additional data elements from the social messaging system 130 for transfer and storage at the client device. In some embodiments, the data distribution system 160 resides on the social messaging system 130 and the client device 110 interacts with the data distribution system 160 as a terminal, which retrieves and loads information from the social messaging system 130 to the client device 110. In some embodiments, the client device 110 includes at least a portion of the data distribution system 160, as described above. In other examples, client device 110 may include the entirety of the data distribution system 160. In instances where the client device 110 includes a portion of (or all of) the data distribution system 160, the client device 110 can work alone or in cooperation with the social messaging system 130 to provide the functionality of the data distribution system 160 described herein.

In some embodiments, the social messaging system 130 may be an ephemeral message system that enables ephemeral communications where content (e.g., video clips or images) are deleted following a deletion trigger event such as a viewing time or viewing completion. In such embodiments, a device uses the various components described herein within the context of any of generating, sending, receiving, or displaying aspects of an ephemeral message. For example, a device implementing the data distribution system 160 may facilitate, direct, or cause communication between the social messaging system 130 and one or more client devices to selectively partition and precache sets of data elements at the one or more client devices. In some embodiments, data elements are selected for inclusion, in a precached set of data elements, and transmission to a client device based on a current or predicted device context for the client device. A device context may represent a time, location, set of permissions, or method of operating a client device, with respect to data, metadata, partition characteristics, or other information related to at least a portion of data elements stored at the social messaging system 130. The device may retrieve a data element, from a precache or the social messaging system 130, and include an effect or representation of the data element as a part of a process of generation content for an ephemeral message, using at least a portion of the data distribution system 160.

Figure 2:
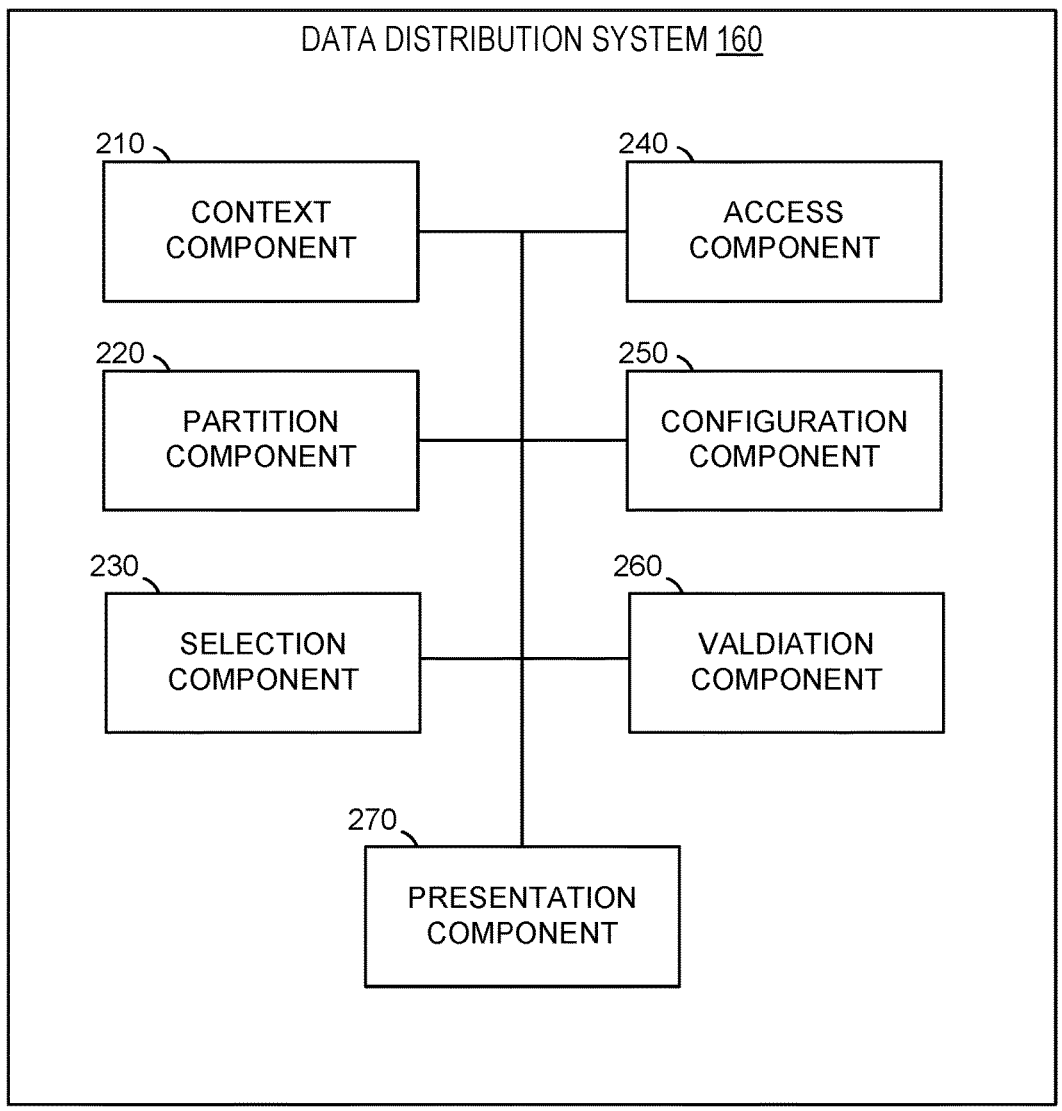
FIG. 2 is a diagram illustrating a data distribution system, according to some example embodiments.

In FIG. 2, in various embodiments, the data distribution system 160 can be implemented as a standalone system or implemented in conjunction with the client device 110, and is not necessarily included in the social messaging system 130. The data distribution system 160 is shown to include a context component 210, a partition component 220, a selection component 230, an access component 240, a configuration component 250, and a validation component 260. The context component 210 may be configured to, for example, identify device contexts for mobile computing devices (e.g., the client device 110). The partition component 220 may be configured to, for example, identify cells (e.g., decompositions of areas of the earth) based on a device context. The selection component 230 may be configured to, for example, select sets of data elements corresponding to a cell. The access component 240 may be configured to, for example, retrieve data elements or indications of selected data elements. The configuration component 250 may be configured to, for example, identify partition characteristics corresponding to a current state of a mobile computing device. The validation component 260 may be configured to, for example, determine a failures associated with cell identification, data elements, or refresh conditions. All, or some, of the components 210-260, communicate with each other, for example, via a network coupling, shared memory, and the like. Each component of components 210-260 can be implemented as a single component, combined into other components, or further subdivided into multiple components. Other components not pertinent to example embodiments can also be included, but are not shown.

Figure 3:
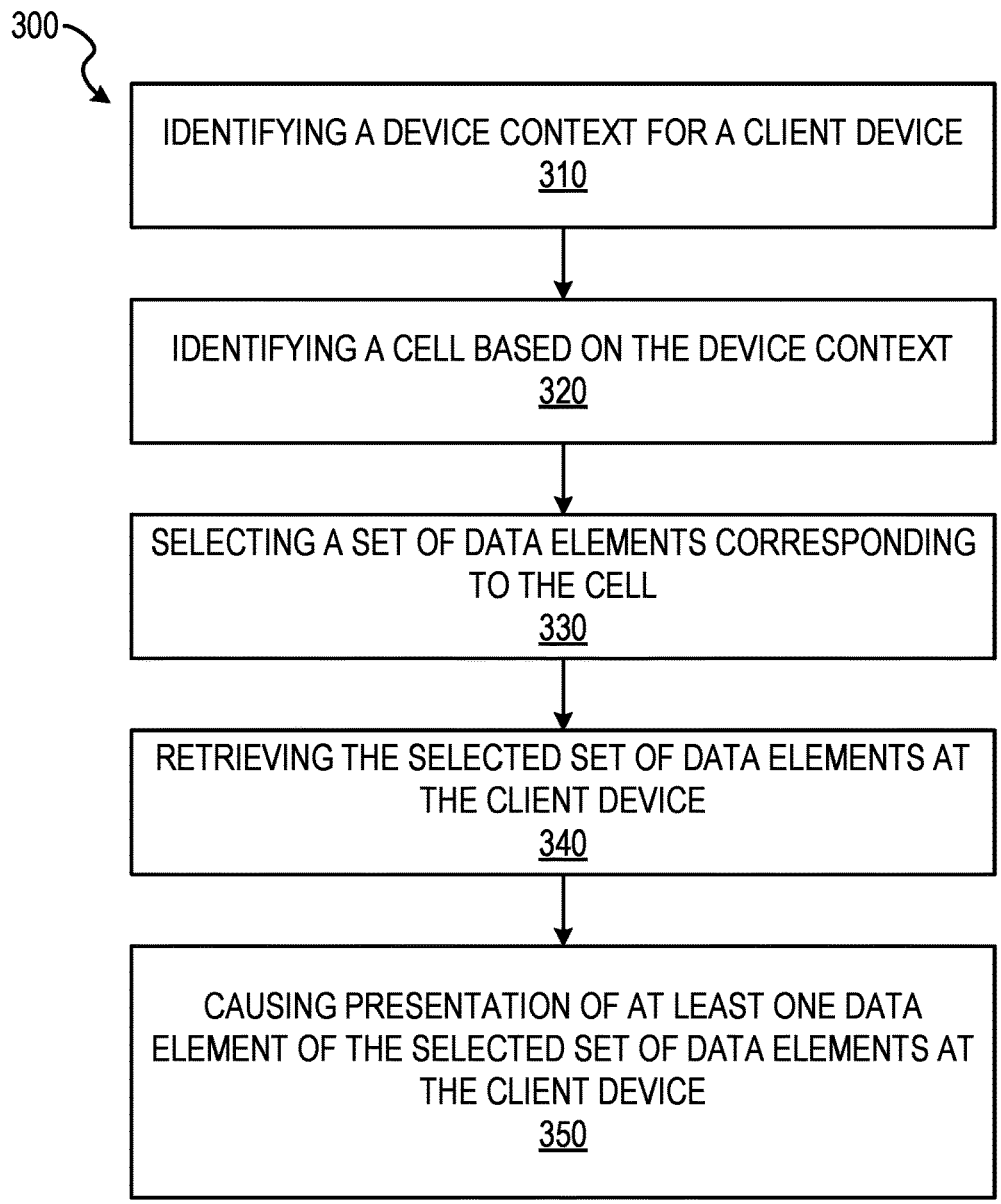
FIG. 3 is a flow diagram illustrating an example method for selectively partitioning and precaching data elements, according to some example embodiments.

FIG. 3 depicts a flow diagram illustrating an example method 300 for selectively partitioning and precaching data elements. The precached data elements may be preloaded unlockable processor executable instructions configured to cause modification of data captured within an application. The operations of method 300 may be performed by components of the data distribution system 160, and are so described below for purposes of illustration.

In operation 310, the context component 210 identifies a device context for a client device (e.g., the client device 110). The context component 210 may identify the device context using one or more components of the client device. The components of the client device enabling identification of the device context may include a global positioning system (GPS) receiver, a time sensor (e.g., a clock or a communication component synchronizing a local time at the client device with a server clock), an accelerometer, a processor-readable storage device (e.g., a memory, a database, or a table), a processor, a network connection, a battery (e.g., a battery capacity or a current battery charge), a communications component (e.g., a transmitter, a receiver, or a transceiver), or any other suitable component.

In some embodiments, the context component 210 identifies the device context in response to a user interaction with an application accessible by the client device. In such embodiments, the user (e.g., a member of the social messaging system 130) opens the application or logs into the application. The user may enter a preview screen associated with data elements available for precaching, causing the application to initiate the method 300 and the context component 210 to initiate operation 310. In some instances, opening and interacting with a mode of the application which is unaffiliated with precached data elements causes the application to perform the method 300 as a background operation or set of operations. Performing the method 300 as a background operation or set of operations may enable improvement in efficient use of computing resources, including processing and memory resources. Background operations may be performed to enable a user, operating the client device, access to varying data elements automatically based on changes in device context. Such background operations may automatically modify data elements stored at a client device based on current device contexts, minimize storage space occupied by data elements, or selectively load new or different data elements to limit, delay, or time use processing cycles or data bandwidth.

In embodiments where the context component 210 determines the device context from the GPS receiver, the context component 210 may identify the device context based on a current location of the client device. In such instances, the device context reflects one or more of the current location of the client device, a current coordinate position, a current longitude and latitude, a geographic range extending a distance outward from the current location of the client device, presence of the client device within a geographic range extending outward from a previous location of the client device, a correspondence of the current location with a cell associated with a geographic region, or any other suitable position information. In some instances, the geographic range may extend from the a few feet from the current location or a number of miles or kilometers from the current location. A granularity for the geographic range or the current location may be determined by a sponsor of the data element, a condition of the data element (e.g., an event location or a visible range for an astronomical event), or any other suitable basis. As such, in some embodiments, a cell may be understood as a defined area representing a region at, above, or below the surface of the earth.

In embodiments, where the context component 210 determines the device context from the time sensor, the context component 210 may identify the device context based on a current time of the client device or a difference between a current time and a previous time at which the context component 210 determined a previous device context. In such instances, the context component 210 identifies the previous device context and a time at which the previous device context was identified. The context component 210 then determines the current time. The context component 210 then determines an expiration time (e.g., an oldest downloaded data element, a specified time or date of download, or a time period between a download and the current time) for data elements previously downloaded from the social messaging system 130. The device context may represent a time, from the current time, until termination of the expiration time for the previously downloaded data elements.

In embodiments where the context component 210 determines the device context from the accelerometer of the client device, the context component 210 determines a current location of the client device from the GPS receiver or other location sensor. In some instances, using a combination of the GPS receiver and the accelerometer, the context component 210 determines a speed of travel and a direction of travel of the client device. The context component 210 predicts a destination (e.g., a final location at a termination of travel of the client device) based on the current location, the speed of travel, and the direction of travel of the client device. The context component 210 then determines the device context as the predicted destination or predicted location for the client device.

In embodiments where the context component 210 determines the device context from the network connection, the context component 210 may identify one or more of a connection strength between a network or a network asset (e.g., a database, a server, the database server 132, the database 134, or the social messaging system 130) and the client device; a network traffic characteristic (e.g., an upload rate, a download rate, a bandwidth, a throughput, a roundtrip time, a number of dropped packets, or a number of TCP retransmissions); or any other suitable metrics or characteristics of communication between the client device and one or more network assets. For example, the context component 210 may determine the device context based on an available bandwidth with which the client device can download data elements from the social messaging system 130. By way of further example, the context component 210 may determine the device context based on a signal strength accessible to the client device for downloading data elements from the social messaging system 130. In some instances, the context component 210 determines a location based device context from the network connection, by triangulating or otherwise calculating a location of the client device using a relative location of a set of communication receivers or transceivers, associated with the network 104, with respect to the client device.

In embodiments where the context component 210 employs the processor-readable storage device to determine the device context, the context component 210 may determine one or more network context of the client device based on one or more of processor-executable instructions and one or more data elements stored on the processor-readable storage device. In such instances, the context component 210 may derive the device context from a data usage limit, a data type, an application type, an Internet Service Provider (ISP) characteristic, a mobile phone plan characteristic, or any other suitable information associated with one or more of the client device, a user (e.g., a member of the social messaging system 130) of the client device, a network, or a service provider associated with one or more of the user and the client device. For example, the context component 210 may determine the device context with respect to an amount of data available to the user of the client device for download within a time remaining until expiration of a predetermined period of time (e.g., an amount of remaining data for a month according to a data plan).

In some instances where the context component 210 employs the processor-readable storage device to determine the device context, the context component 210 determines a current login for the client device. The context component 210 determines a previous login for the client device. The context component 210 compares the current login with the previous login. Where the context component 210 identifies a match between the current login and the previous login, the context component 210 may determine the device context matches a previous device context, corresponding to the previous login. Where the context component 210 identifies a mismatch between the current login and the previous login, the context component 210 may determine a subsequent device context, based on a difference between the current login and the previous login.

In instances where the context component 210 employs the processor-readable storage device to determine the device context, the context component 210 accesses one or more data storage formations within the processor-readable storage device. In some instances, the context component 210 identifies a data storage formation corresponding to a calendar associated with the client device. The context component 210 identifies an event within the calendar, corresponding to a current time and a current location of the client device. The context component 210 then determines the device context based on the event.

In embodiments where the context component 210 employs the battery to determine the device context, the context component 210 may determine a battery capacity and a current battery charge. The context component 210 may then determine an amount of battery usage for downloading a set of data elements from the social messaging system 130. The context component 210 may then determine the device context based on data elements stored on the client device associated with the data distribution system 160 and an amount of data elements available for download from the social messaging system 130. In some embodiments, the context component 210 determines the device context based on a minimum battery charge for the battery of the client device. In such embodiments, the context component 210 determines a difference between the current battery charge and the minimum battery charge. A number of data elements able to be downloaded in the difference between the current and minimum battery charge may be reflected by the device context.

Although described with respect to individual sensors or express combinations of sensors, or data gathered from one or more sensors, the context component 210 may determine the device context for the client device from any one or more of the sensors forming part of or accessible to the client device. In some embodiments, the context component 210 determines the device context using a plurality of components or sensors of the client device, described herein. In some embodiments, the context component 210 determines one or more components or sensors of the client device to use, in determining the device context, based on one or more of the data elements currently stored on the client device, the data elements available for download from the social messaging system 130, an expiration metric (e.g., a time, a location, a login, or an event), or any other suitable characteristics of the data elements corresponding to the sensors accessible by the client device.

In operation 320, the partition component 220 identifies a cell based on the device context. The cell may be a hierarchical decomposition of the earth sphere into compact representations of regions. Hierarchical cells at differing levels may be associated with differing areas or sizes. The cell, or an indication thereof, may be stored in a data structure on the processor-readable storage device of the client device.

In some embodiments, the partition component 220 identifies the cell from one or more partition characteristics associated with the cell. The partition component 220 may match one or more aspects of the device context to the one or more partition characteristics to identify the cell. Upon matching the one or more partition characteristics, the partition component 220 may identify a cell identifier for the cell. The partition component 220 may pass the cell identifier to one or more components of the data distribution system 160 for use in identifying, retrieving, and presenting data elements associated with the cell.

Partition characteristics may represent one or more of a time, a geographic area, a population, a client device, and one or more data elements available for retrieval from the social messaging system 130. One or more partition characteristics may be associated with cells into which a geographical area are divided. In some instances, as described in more detail below, a given geographic area may be divided into a plurality of cells based on partition characteristics of one or more of the geographic area, the set of data elements, a client device, or a member profile. The geographic area may also be divided into cells and assigned suitable partition characteristics associated with one or more data element suitable for an event, a location, or a time associated with the cell.

Where one or more of the cell and the partition characteristics are associated with data elements, the data elements may be filters, metadata elements, or other processor executable instructions configured to modify information (e.g., images or video streams) captured by the client device. Data elements may be retrieved or precached at a time or location prior to their use. Data elements may transition from precached data elements to live data elements, where the data element is made available for use on the client device. In some instances, data elements transition from inactive to live in a precache, where a time or location condition has been satisfied. Cells may be associated with specified data elements, and may be queried to retrieve existing data elements or precache subsequent data elements. A cell may be inactive or live, as associated with a precache of data elements, based on an availability of data elements for use at the client device.

In some embodiments, one or more of the cell and the one or more partition characteristics are associated with a plurality of data elements. The data elements may be stored on a processor-readable storage device of the client device for which the device context is identified. Where the data elements are stored on the client device, the plurality of data elements form a precache of data elements.

In some embodiments, the data elements are stored at the social messaging system 130. In such embodiments, portions of the plurality of data elements may be stored on both the client device and the social messaging system 130, such that a first instance of a portion of the plurality of data elements are stored at the social messaging system 130 and a second instance of a portion of the plurality of data elements are stored on the client device. The portion of data elements stored on the client device represent a precache of data elements, while the portion of data elements stored on the social messaging system 130 represent available data elements for retrieval and populating a precache on the client device.

In some instances, the client device stores metadata associated with portions of the plurality of data elements. Metadata associated with the data elements, or associated with a cell, may represent properties of one or more of the cell or the data elements. In some embodiments, metadata comprises one or more of a release characteristic (e.g., a schedule, a time, or a location), display parameters for a data element, a uniform resource locator (URL) for each of the data elements of the selected set, a location (e.g., a set of coordinates, a geographic area, a targeted geofence, or a position) associated, or any other suitable information pertaining to the selected set of data elements.

Where metadata of the cell or data elements are stored on the client device, the plurality of data elements are stored on the social messaging system 130. The metadata may be stored within a precache, prior to entering a cell associated with the data elements and the metadata. Upon arrival in the cell associated with the metadata, one or more components of the data distribution system 160 use the metadata to retrieve the data elements associated with the cell or the one or more partition characteristics. Retrieval of the information upon entering the cell may be based on the device context including a location of the device within or proximate to the cell. In some instances, the retrieval of the information (e.g., the plurality of data elements) may be based on the device context and a release condition. The release condition may be a characteristic of the device context. The release condition may comprise one or more of a location, a time, a release date, a beginning of an event, or any other suitable information. Satisfaction of the release condition may enable or activate data elements, such that the activated data elements become live and available for use in an application. As will be described in more detail below, where the partition component 220 fails to identify the cell, fails to identify a precache of data elements, or fails to identify the one or more partition characteristics, or identifies satisfaction of a refresh condition, one or more components of the data distribution system 160 may retrieve one or more of a portion of the plurality of data elements, an indication of a cell for the portion of the plurality of data elements, and the one or more partition characteristics to generate a precache.

In operation 330, the selection component 230 selects a set of data elements corresponding to the cell. In some embodiments, the selection component 230 receives the cell identifier or the cell identified by the partition component 220 in operation 320. Upon receiving the cell or cell identifier, the selection component 230 identifies the selected set of data elements as one or more data elements (e.g., a group of data elements) associated with the cell and stored on the client device (e.g., in a data structure on the processor-readable storage device of the client device).

In some instances, the selection component 230 selects the set of data elements by identifying the one or more partition characteristics associated with the cell. In such instances, the selection component 230 receives the cell identifier from the partition component 220 and identifies the one or more partition characteristics associated with the cell. The selection component 230 may then identify one or more data elements associated with the one or more partition characteristics as the selected set of data elements.

In some instances, the selection component 230 determines live (e.g., currently available) data elements from the group of data elements associated with the cell or the one or more partition characteristics. The selection component 230 selects the live data elements for inclusion in the selected set of data elements. In such instances, live data elements are data elements available for retrieval or use at the client device currently based on one or more of the device context, the cell, the one or more partition characteristics, or any other suitable activation condition. The group of data elements associated with the cell, the cell identifier, or the one or more partition characteristics may include the live data elements and one or more inactive data elements. The selection component 230 may select data elements which include or are associated with a live status for inclusion in the selected set of data elements.

As will be explained in more detail below, if the partition component 220 failed to identify a cell or indication of a cell on the client device, in some embodiments, the selection component 230 initiates a set of operations to refresh an existing precache of data elements. The selection component 230, alone or in cooperation with other components of the data distribution system 160, may access data elements stored on the social messaging system 130 and retrieve those data elements to generate or populate a precache, refresh an existing precache, or refresh a portion of an existing precache.

In some embodiments, in parallel to selection of the set of data elements, the access component 240 performs a retrieval operation. The retrieval operation, which may comprise generation of a remote procedure call (RPC) and retrieval of information from the social messaging system 130, will be described in more detail below. The access component 240 may fetch one or more data elements, or indications of data elements, from the social messaging system 130 to identify a full set of live data elements available at the social messaging system 130. The full set of live data elements may be based on the device context identified in operation 310 or the cell identified in operation 320.

The access component 240 passes the full set of live data elements, or indications thereof, to the validation component 260. The validation component 260 may then compare the fill set of live data elements to the selected set of data elements identified by the selection component 230 on the client device. The validation component 260 then compares the selected set of data elements and the full set of live data elements to determine whether the selected set of data elements matches the full set of live data elements. Where the selected set and the full set are a match, the validation component 260 generates a validation indicator, and the selected set of data elements are passed to the access component 240, or made available thereto. Where the selected set and the full set fail to match, the validation component 260 identifies one or more data elements from the selected set of data elements or the full set of live data elements which mismatch. Where the mismatching data elements occur in the selected set of data elements, the validation component 260 may determine whether the mismatching data elements are expired or subject to refresh, precluding presentation of the mismatching data elements. Where the mismatching data elements occur in the full set of live data elements, the validation component 260 may generate a refresh indicator identifying the mismatching data elements. The validation component 260 may then pass the refresh indicator to the access component 240 to retrieve and supplement the existing precache of data elements or the selected set of data elements with the mismatching data elements from the social messaging system 130.

In operation 340, the access component 240 retrieves the selected set of data elements. In some embodiments, the access component 240 retrieves the selected set of data elements from the processor-readable storage device of the client device, in response to receiving an indication of the data elements included in the selected set of data elements. The access component 240 may receive the indication of the selected set of data elements from the selection component 230.

In some instances, the access component 240 retrieves the selected set of data elements from the social messaging system 130. In such instances, the access component 240 may receive, from the selection component 230, the metadata elements associated with the selected set of data elements or the cell. The metadata elements may indicate data elements to be included in the selected set of data elements without, such that the selected set of data elements may be retrieved on demand at a time of or just prior to use of a data element of the selected set of data elements. The access component 240 may query the social messaging system 130 with the metadata elements, and receive the selected set of data elements in response to the metadata query. In some embodiments, the access component 240 retrieves the selected set of data elements by submitting a query, to the social messaging system 130, which includes a refresh request for a cell, a set of data elements of a previously generated precache, the one or more partition characteristics, or any other suitable information.

In operation 350, the presentation component 270 causes presentation of at least one data element of the selected set of data elements at a display device coupled to the client device. In some embodiments, the presentation component 270 presents the at least one data element in response to an access request at the client device, initiating an operation mode of an application which is associated with the data elements. The presentation component 270 may cause presentation of the at least one data element as a selectable user interface element. Selection of the user interface element causes the client device to initiate use of the data element within the application operating on the client device. For example, where the data elements are filters, modifying capture of images or video streams captured by the client device, the presentation component 270 causes presentation of a representation (e.g., an icon) of the filters. Selection of the representation of a filter applies the filter to a current field of view of an image capture device, where the field of view of the image capture device is being presented on a display device (e.g., a screen) of the client device.

In some embodiments, operation 350 includes one or more sub-operations. In such embodiments, prior to presentation of the at least one data element by the presentation component 270, the configuration component 250 may identify a partition characteristic, identified in operation 320, as corresponding to a current state of the client device. The current state of the client device may indicate a current context or manner of operation of the client device. For example, the partition characteristic may comprise a current time and a current location for the client device. The current state may also represent a mode of operation for the application in use on the client device. In some instances, the configuration component 250 identifies the partition characteristic corresponding to the current state of the client device, based on the partition component 220 identifying the one or more partition characteristics in operation 320 or the device context in operation 310.

In some instances, the configuration component 250 identifies the partition characteristic corresponding to the current state of the client device in a subsequent operation, after operation 320. In such instances, the operation 320 may have been performed at a time prior to initiation of operation 350. The configuration component 250 may determine the current state of the client device matches at least one element of the device context, such as a time or a position of the client device. Upon identifying the partition characteristic corresponding to the current state of the client device, the configuration component 250 enables presentation of the selected set of data elements by the application associated with the social messaging system 130 and operating on the client device.

In some embodiments, one or more of the selection component 230 and the presentation component 270 selects a subset of data elements of the selected set of data elements for presentation as the at least one data element presented in operation 350. In some instances, the context component 210 determines one or more display characteristics of the client device. The one or more display characteristics may comprise a screen size, dimensions or measurements of a screen, a number of pixels of the screen, a font size, a graphical user interface size, a graphical user interface display setting, a device type of the client device (e.g., a smartphone, a smart watch, a laptop, or a tablet), a menu configuration for the subset of data elements (e.g., a number of icons to be displayed to represent data elements), an icon size for selectable user interface elements representing the data elements, or any other suitable display characteristic. Based on the one or more display characteristics, the context component 210 determines a number of data elements for inclusion in the subset of data elements.

In response to determining the number of data elements for inclusion in the subset of data elements, the selection component 230 selects a number of data elements from the selected set of data elements matching the number determined by the context component 210. In some embodiments, the selection component 230 selects the data elements based on a prioritization determination. The selection component 230 may determine the prioritization of data elements based on one or more of the device context, the time, the location, the display characteristics, the set of permissions, partition characteristics, one or more data element characteristics, combinations thereof, or any other suitable prioritization metric. In some instances, the one or more data element characteristics comprise a bid amount, a data element distribution agreement, an event, an event location, an astronomical event, a condition of the data element, a sponsor of the data element, combinations thereof, or any other suitable data element characteristics or aspects relating to data elements or producers of data elements.

Figure 4:
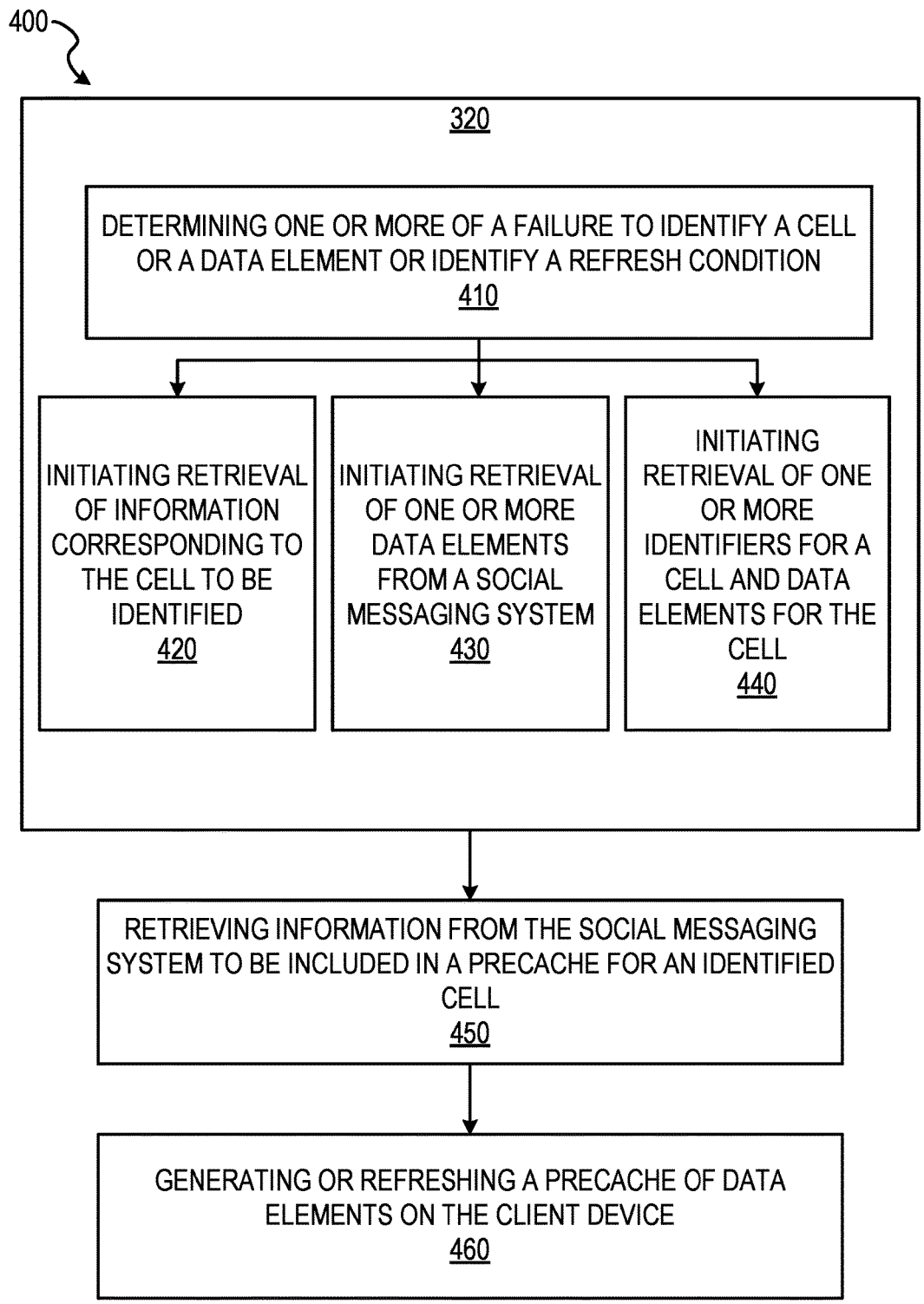
FIG. 4 is a flow diagram illustrating an example method for selectively partitioning and precaching data elements, according to some example embodiments.

FIG. 4 depicts a flow diagram illustrating an example method 400 for selectively partitioning and precaching data elements, according to various example embodiments. The operations of method 400 may be performed by components of the data distribution system 160. In some instances, certain operations of the method 400 may be performed where operation 320 of the method 300 fails to identify a cell or identifies a refresh condition. In some embodiments, certain operations of the method 400 may be performed where operation 330 of the method 300 fails to select the set of data elements. Failure to select the set of data elements may be a response to a failure to identify a cell in operation 320. As described, operations of the method 400 may be performed using one or more operations of the method 300 or as sub-operations of one or more operations of the method 300, as will be explained in more detail below.

In operation 410, the validation component 260 determines a failure in operation 320 of the method 300. The validation component 260 may determine the failure is associated with a failure to identify a cell, a failure to identify data elements associated with the cell, or an identification of a refresh condition. Upon determining a failure type for operation 320, the validation component 260 passes an indication of the failure type to one or more components of the data distribution system 160 to correct the failure of operation 320.

In operation 420, in response to a failure to identify a cell in operation 320, the partition component 220 retrieves information corresponding to the cell to be identified. In some embodiments, the partition component 220 identifies one or more of a gap in a cell table (e.g., a data structure representing a set of cells stored on the client device), a corrupted cell, or an absence of a previously generated precache on the client device. The partition component 220 passes an indication of the cell, cell table gap, or precache absence to the access component 240. In response to receiving the indication from the partition component 220, the access component 240 transmits the indication to the social messaging system 130. In some instances, the indication includes the device context, indicating one or more of a location and a time currently associated with the client device. Transmission of the indication may comprise an initial operation in a retrieval procedure. In some instances, the retrieval procedure comprises fetching data from the social messaging system 130 by generating an RPC, and passing the PRC to the social messaging system 130. The RPC may comprise a request for one or more of metadata for a cell (e.g., a cell indicator), a cell table, and data elements associated with a cell or a cell table from the social messaging system 130.

In operation 430, in response to a failure to identify data elements associated with the cell identified in operation 320, one or more of the partition component 220, the selection component 230, and the access component 240 generate a request or query to retrieve one or more data elements from the social messaging system 130. For example, the selection component 230 may receive one or more partition characteristics or a cell identifier from the partition component 220, but receive no indication of data elements associated with the partition characteristics or the cell identifier. The selection component 230 may then generate a query (e.g., an RPC) identifying one or more of the partition characteristics and the cell identifier. In such examples, the selection component 230 may pass the query to the access component 240 for transmission to the social messaging system 130. Retrieval of the one or more data elements enables the selection component 230 to generate or refresh the precache of data elements associated with the cell. The request or query may be generated in a manner similar to that described above with respect to operation 420.

In some embodiments, the partition component 220 initially fails to determine a precache of data elements associated with an identified cell. The partition component 220 may fail to identify the precache based on an expiration of one or more data elements in the precache, a lack of data elements (e.g., no previous precache of data elements was generated for the cell or on the client device), or a corruption of the precache. The partition component 220 passes an indication of the failure (e.g., a failure indicator) in identifying the precache of data elements to the access component 240. The failure indicator may comprise identification of the cell, metadata for the cell, one or more known missing data elements, a lack of any data elements in a precache for the cell, or any other suitable information. The access component 240 may then access the social messaging system 130 using the RPC to retrieve the data elements to generate or refresh the precache.

In operation 440, in response to identifying a refresh condition in operation 320, one or more of the partition component 220, the selection component 230, and the access component 240 retrieve one or more of identifiers for the cell and data elements associated with the cell. The partition component 220 passes the cell and data element identifiers to the access component 240. The access component 240 may generate the RPC for transmission to the social messaging system 130, in a manner similar to that described above with respect to operation 420. In some embodiments, the RPC call comprises one or more of the identifier for the cell, identifiers for the data elements associated with the cell, an indicator of the refresh condition, and the device context identified in operation 310.

In operation 450, in response to transmitting the RPC to the social messaging system 130, the access component 240 retrieves one or more of the metadata for the cell, the cell, the cell table, and the data elements to be included in a precache for an identified cell. The access component 240 may pass the retrieved data to one or more of the components of the data distribution system 160 to generate or refresh the precache of data elements for the cell. In some embodiments, upon receiving a response of the social messaging system 130, the data distribution system 160 initiates the operation 320 again to proceed with the method 300 based on the device context initially determined in operation 310 and the retrieved or refreshed precache data.

In some instances, in retrieving data elements to generate or refresh the precache, the data distribution system 160 identifies data elements to replace or supplement a portion of data elements stored in a current precache of data elements located on the client device. The data distribution system 160 may identify the data elements to supplement or replace those on the client device by determining an eligibility of the data elements on the social messaging system 130. In some embodiments, eligibility is determined based on the device context of the client device, the query (e.g., a cell or one or more partition characteristics), a time, an event, a data element release schedule, a sponsor of a data element, or any other suitable information. In such embodiments, the data distribution system 160 determines one or more live data elements (e.g., data elements currently eligible for display based on information received from the client device), and transmits the live data elements to the client device.

In operation 460, upon retrieving the one or more cell, the cell metadata, the cell table, or the data elements, the configuration component 250 generates or refreshes a precache of data elements on the client device. Where no precache of data elements was previously stored on the client device, the configuration component 250 may generate the precache, generate the cell, and associate the cell and precache. Where a precache of data elements was stored on the client device, unassociated with a cell, the configuration component 250 may generate the cell and associate the cell with the preexisting precache of data elements. Where a preexisting precache of data elements, some or all of which have expired or are subject to refresh, the configuration component 250 refreshes the preexisting precache of data elements by replacing one or more of the expired data elements or cell information in the precache.

In some embodiments, the configuration component generates or refreshes the precache of data elements by storing one or more of the data elements or cell information in a data structure including a preexisting precache or designated for a specified precache or cell. For example, the data structure may comprise a data table including designations for cells and data elements associated with the cell designations. In some instances, storage of the precache of data elements may be performed such that one or more of the data elements are not made visible or available for selection at the client device. In such instances, a condition may be satisfied (e.g., a refresh condition, a login condition, a location condition, or a time condition) prior to the data elements being made visible and available for selection within the application.

Figure 5:
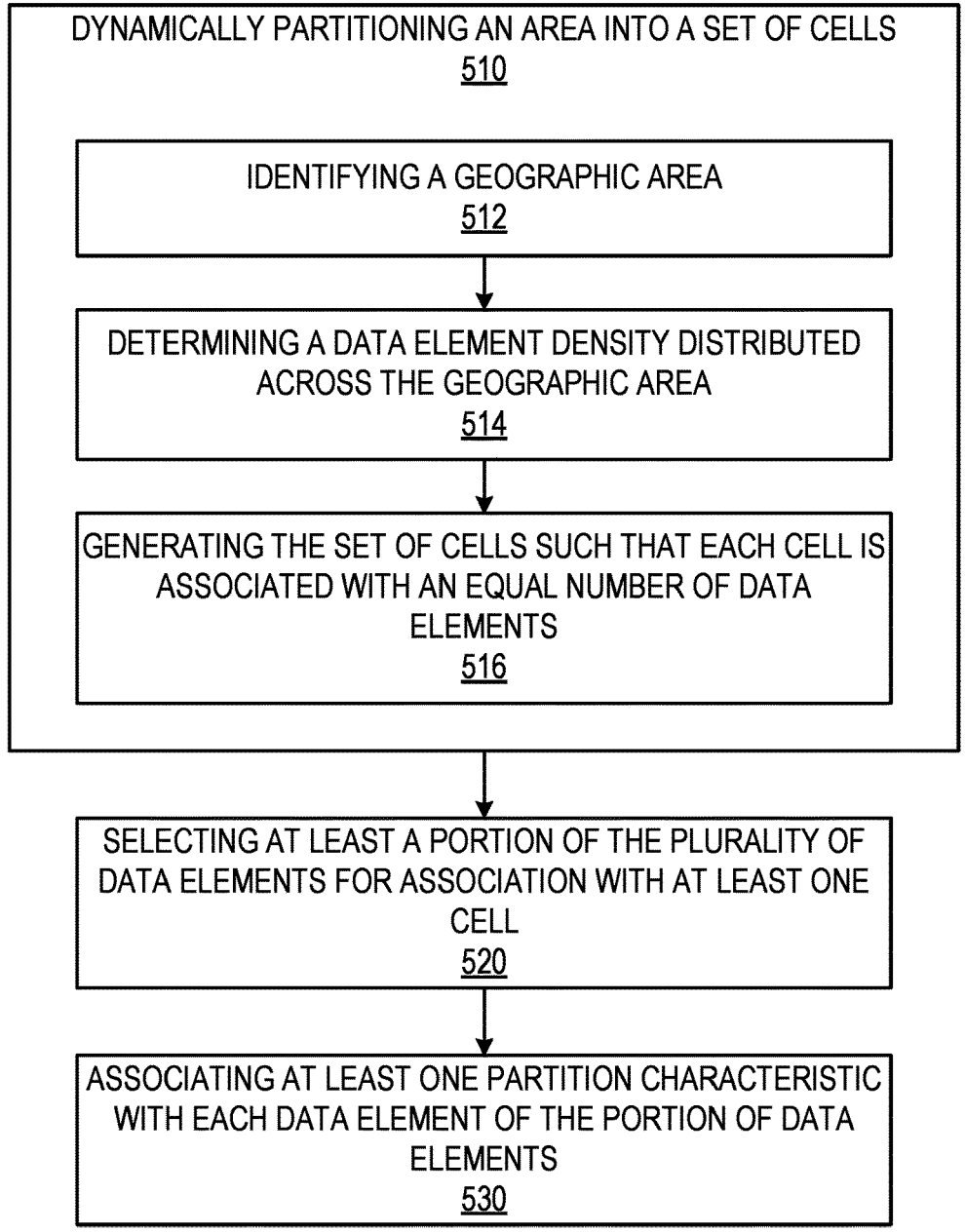
FIG. 5 is a flow diagram illustrating an example method for selectively partitioning and precaching data elements, according to some example embodiments.

FIG. 5 depicts a flow diagram illustrating an example method 500 for selectively partitioning and precaching data elements, according to various example embodiments. The operations of method 500 may be performed by components of the data distribution system 160. In some instances, certain operations of the method 500 may be performed using one or more operations of the method 300 or as sub-operations of one or more operations of the method 300, as will be explained in more detail below.

In operation 510, the partition component 220 dynamically partitions an area into a set of cells. Each cell of the set of cells may correspond to at least one partition characteristic of a plurality of partition characteristics. The partition characteristics may be used to divide a geographic area into cells. In some embodiments, the partition characteristics comprise one or more of a value for a defined area (e.g., a square mile, a square kilometer, an acre, or a city block), a proximity (e.g., a proximity to an area or location), a defined location, a set of GPS coordinates, combinations thereof, or any other suitable area measurement, position, or location or a characteristic related thereto. In some instances, partition characteristics related to areas, positions, or locations include one or more of a number of data elements (e.g., filters), a number of filters per defined area of a cell or of the geographic area (e.g., 1,000 filters per square kilometer), a time, a population density (e.g., a population for a given geographic area), a network metric for a given geographic area, an event (e.g., a location of an event or a location of an event in a given time period), combinations thereof, or any other suitable metric or characteristic by which one or more of the geographic area and a set of data elements available for access and retrieval from the social messaging system 130.

A proximity partition characteristic may be a proximity to an event, a specified location (e.g., an arena, a concert hall, or a town), a geographic formation (e.g., a beach, a mountain, or a canyon), an astronomical event (e.g., an eclipse, an aurora, a star formation), or a weather event (e.g., a storm, a snowfall, or a sunny day). In embodiments where the proximity partition characteristic is a proximity to an astronomical event, the proximity may be a visible area of the astronomical event, such as a proximity (e.g., a range or distance) to the astronomical event at which the astronomical event is visible to a member of the social messaging system 130. In some instances, a time partition characteristic may include a time of day, a time within a set time range or period, a season, a time of year, or any other suitable metric or range of time.

In embodiments where the partition characteristic is based on a member profile (e.g., a profile for a member of the social messaging system 130). The partition characteristic may comprise one or more of a gender, an age, an activity level, an indication of an activity (e.g., a hobby, an interest, or a job), or any other suitable attribute of the member profile. In some instances, the partition characteristic is based on a combination of an aspect of the member profile and an aspect or characteristic of time, geographic area, event location, or other suitable metrics or characteristics.

In some embodiments, the partition component 220 dynamically partitions the area into the set of cells at the social messaging system 130. In such embodiments, the partition component 220 may maintain the dynamic partition of the set of cells at the database 134 of the social messaging system 130. The partition component 220 may also dynamically partition the area into the set of cells at the client device. In such instances, the partition component 220 may identify an area (e.g., a geographic region) within which the client device is located. The partition component 220 may initially determine a position of the client device using one or more sensor of the client device. For example, the partition component 220 may poll the GPS sensor of the client device to determine the position of the client device. In response to determining the position of the client device, the partition component 220 may determine a geographic area or region within which the position is located. Based on the position of the client device and the geographic area, the partition component 220 may then partition the area into the set of cells.

In some embodiments, the partition component 220 dynamically partitions the area, based on a combination of the geographic area, the position of the client device, and one or more partition characteristics. For example, the partition component 220 may dynamically partition the area, such that each cell is associated with an equal number of data elements to evenly distribute a density of the data elements across each cell. Further, each cell may be partitioned to enable the client device to retrieve all data elements for a given cell, based on an available storage area of the client device. The partition characteristics may be associated with one or more of the geographic area and the client device. Although described with reference to specific examples, the partition component 220 may dynamically partition the cells using any suitable combination of the position of the client device, the geographic area in which the device is located, and partition characteristics associated with one or more of the position, the geographic area, the client device, and time.

In some embodiments, operation 510 comprises one or more additional operations or sub-operations. In such embodiments, the partition component 220 identifies a geographic area in operation 512. The geographic area may surround or partially encompass a position of the client device. In some instances, the position of the client device is located at a center of the geographic area, at any point within the geographic area, or proximate to the geographic area. Where the position of the client device is proximate to the geographic area, the geographic area may be identified as a nearest geographic area to the position of the client device. The geographic area may also be identified as a geographic area containing a predicted location along a direction of travel of the client device.

In operation 514, the partition component 220 determines a data element density distributed across the geographic area. The data element density may be based on a number of data elements of the plurality of data elements which are to be distributed across the geographic area. The data element density may be calculated as a function of the total number of data elements, divided by an area measurement of the geographic area. In some embodiments, the data element density is determined for a plurality of sub-areas of the geographic area. In such embodiments, certain data elements to be distributed within the geographic area may be associated with specified locations, positions, or areas within the geographic area. The distribution of data elements associated with specified locations within the geographic area may result in differential distributions of data elements resulting in two or more data element densities within the geographic area.

In operation 516, the partition component 220 generates the set of cells such that each cell is associated with an equal number of data elements of the plurality of data elements. In some instances, where the distribution of data elements results in two or more data element densities in the geographic area, the partition component 220 generates a set of cells where a first portion of the set of cells is associated with a first number of data elements and a second portion of the set of cells is associated with a second number of data elements.

In operation 520, the selection component 230 selects at least a portion of the plurality of data elements for association with at least one cell of the set of cells. The portion of the data elements associated with a cell may be selected based on a specified location associated with the data element being within the cell. In some embodiments, the selection component 230 selects data elements for inclusion in a cell based on a location of the cell relative to a geographic formation, an astronomical event, a weather event, an event (e.g., a concert), or any other partition characteristic associated with the data element and satisfied by the cell.

In operation 530, the partition component 220 associates the at least one partition characteristic with each data element of the portion of the plurality of data elements. The at least one partition characteristic associated with a data element may be at least one partition characteristic for the at least one cell with which the data element is associated. The result of operations 510, 520, and 530 may result in a data table defining the set of cells and linking each cell with at least one data element and at least one partition characteristic associated with the data element and satisfied by the cell. For example, the cell may be defined by a set of coordinates for an enclosed and bounded region within the geographic area, the cell may be associated with a data element (e.g., a filter for an eclipse), and associated with a partition characteristic (e.g., an astronomical event of the eclipse) for the data element and satisfied by the cell (e.g., the eclipse is viewable from a position within the cell).

Figure 6:
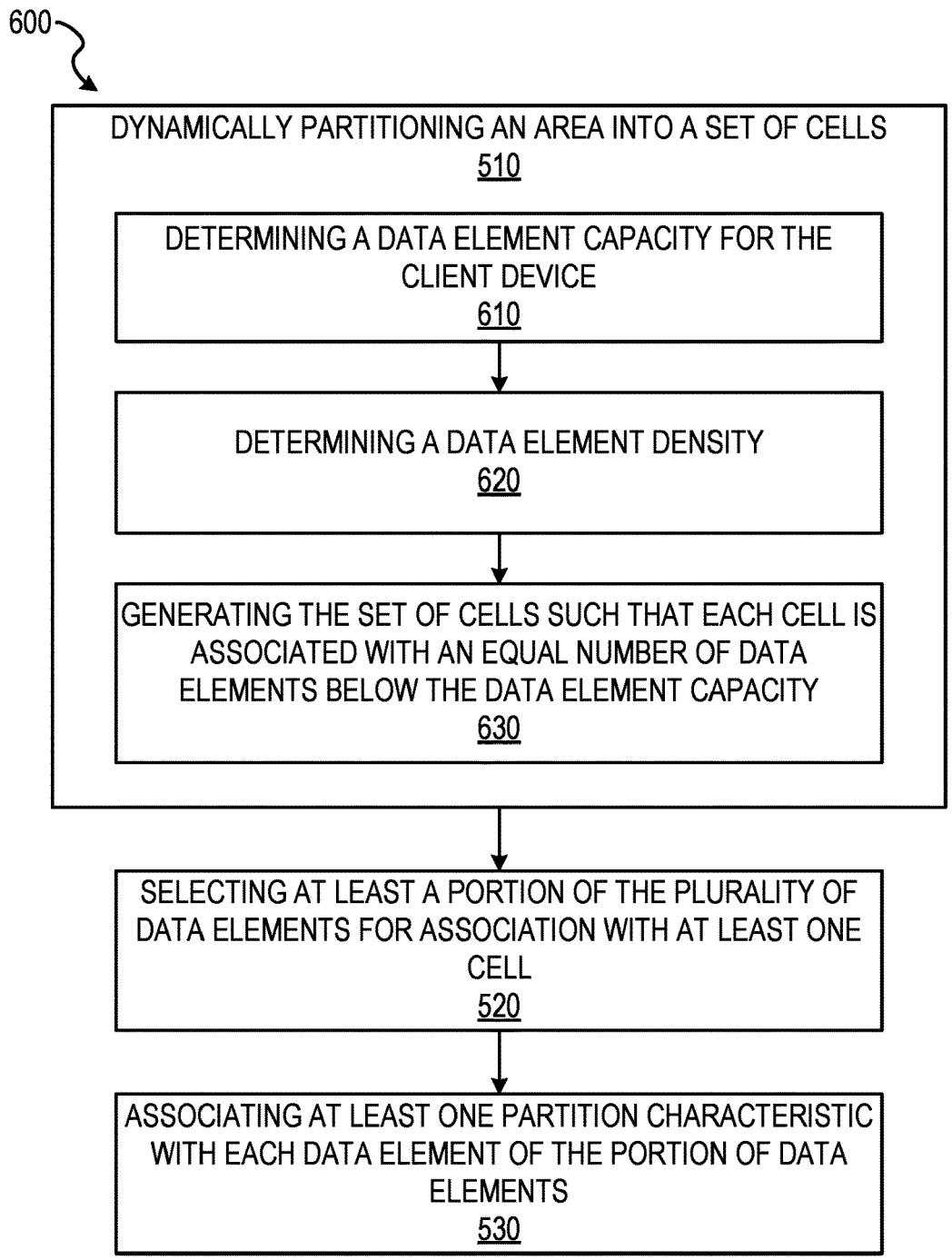
FIG. 6 is a flow diagram illustrating an example method for selectively partitioning and precaching data elements, according to some example embodiments.

FIG. 6 depicts a flow diagram illustrating an example method 600 for selectively partitioning and precaching data elements, according to various example embodiments. The operations of method 600 may be performed by components of the data distribution system 160. In some instances, certain operations of the method 600 may be performed using one or more operations of the method 300 or the method 500 or as sub-operations of one or more operations of the method 300 or the method 500, as will be explained in more detail below. In some embodiments, as shown in FIG. 6, the operations of the method 600 are performed as a portion of operation 510.

In operation 610, the partition component 220 determines a data element capacity for the client device. The partition component 220 may determine the data element capacity for the client device by accessing a processor-readable storage device of the client device and determining an available memory space on the processor-readable storage device. The partition component 220 may determine, from the available memory space, a subset of memory available (e.g., a maximum available element space) for storing data elements retrieved from the social messaging system 130.

In operation 620, the partition component 220 determines the data element density based on the number of data elements to be distributed across the geographic area and the data element capacity of the client device. The partition component 220 may determine a maximum number of data elements which may occupy the maximum available element space. For example, the partition component 220 may determine 1,000 data elements (e.g., filters) may be stored within the maximum available element space on the processor-readable storage device. The partition component 220 may determine a maximum number of data elements available for distribution within the geographic area, such as 10,000 data elements (e.g., filters) for the entire geographic area. The partition component 220 may then determine the data element density is 1,000 data elements per cell, based on the maximum number of data elements available and the maximum available element space.

In operation 630, the partition component 220 generates the set of cells such that each cell is associated with an equal number of data elements. The equal number of data elements for each cell may be below the data element capacity of the client device. In some embodiments, the partition component 220 generates the set of cells by defining boundary elements dividing the geographic area into the set of cells suitable for the data element density. The partition component 220 may define the boundary elements in any suitable manner, such as rectangular boundary elements, circular boundary elements, or any other suitable shape. In some embodiments, based on a size and shape of the geographic area, the partition component 220 may generate the set of cells to have a smaller data element density than the data element density identified in operation 620.

Figure 7:
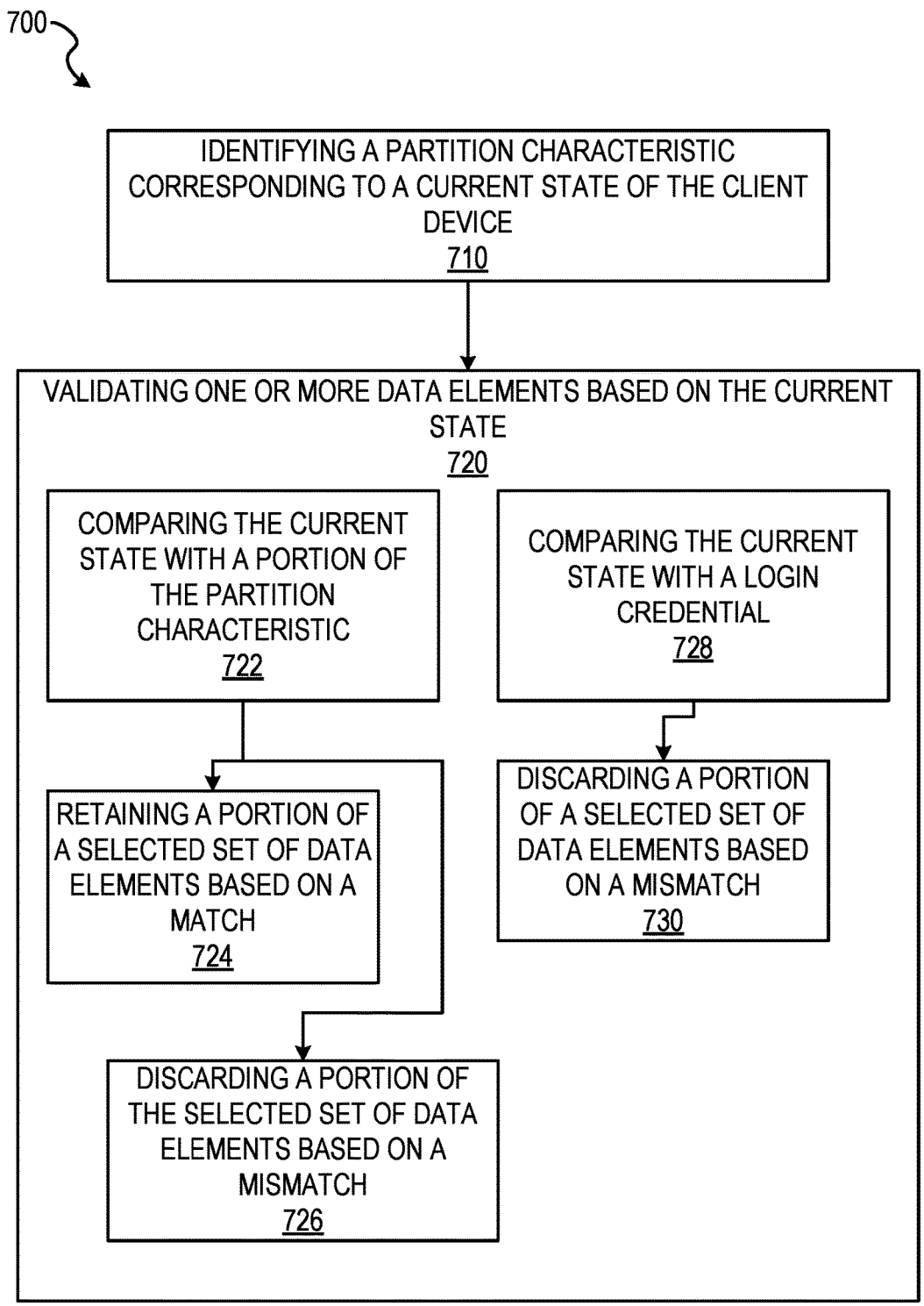
FIG. 7 is a flow diagram illustrating an example method for selectively partitioning and precaching data elements, according to some example embodiments.

FIG. 7 depicts a flow diagram illustrating an example method 700 for selectively partitioning and precaching data elements, according to various example embodiments. The operations of method 700 may be performed by components of the data distribution system 160. In some instances, certain operations of the method 700 may be performed using one or more operations of the methods 300, 500, or 600 or as sub-operations of one or more operations of the methods 300, 500, or 600, as will be explained in more detail below.

In operation 710, the partition component 220 identifies a partition characteristic corresponding to a current state of the client device. The current state of the client device may represent one or more of a time, a location, a direction and speed, a current available memory space, or any other suitable information related to operation of the client device. In some embodiments, to identify the partition characteristic corresponding to the current state, the partition component 220 may parse a set of cells for a geographic area in which the client device is currently operating. The partition component 220 identifies the partition characteristic as a partition component, associated with a cell of the set of cells, matching at least one aspect of the current state of the client device. For example, the partition component 220 may identify a partition characteristic indicating an event, where the event is associated with a cell including a location of a concert venue for the event and the current state of the client device includes a position (e.g., a set of GPS coordinates) proximate to the concert venue.

In operation 720, the validation component 260 validates one or more data elements based on the current state of the client device. In some embodiments, the validation component 260 validates a selected set of data elements based on the current state of the client device, where the selected set of data elements is selected by the selection component 230 in operation 330. The validation component 260 may determine a validity or invalidity of data elements based on location, time, or other characteristics. Upon a determination of invalidity, the validation component 260 may discard data elements and retrieve a subsequent set of data elements. In some instances, the validation component 260 validates data elements stored on the client device, after having previously retrieved the data elements from the social messaging system 130. The validation component 260 may also validate data elements on the client device periodically. In such instances, periodic validation may occur at predetermined time intervals, upon login to an application on the client device, upon satisfaction of an expiration condition, or any other suitable event.

In some embodiments, the validation component 260 comprises a set of sub-operations based on determinations with respect to the current state of the client device and the partition component. Where the current state of the client device corresponds to one or more of a location of the client device and a time, in operation 722, the validation component 260 may compare the current state of the client device with the portion of the partition characteristics corresponding to the selected set of data elements.

In operation 724, based on a match between the current state of the client device and the portion of the partition characteristics, the configuration component 250 retains at least a portion of the selected set of data elements in the processor-readable storage device coupled to the client device. The portion of the selected set of data elements may be retained based on the partition characteristics associated with the portion of data elements matching the current state of the client device. In some embodiments, where a match exists between the current state of the client device and the partition characteristics of the set of data elements stored on the client device, all of the data elements may be retained at the client device.

In operation 726, based on a mismatch between the current state of the client device and the portion of the partition characteristics, the configuration component 250 discards at least a portion of the selected set of data elements. One or more of the selection component 230 and the configuration component 250 also selects a subsequent set of data elements for precaching within the processor-readable storage device coupled to the client device. In some embodiments, the configuration component 250 discards any data element having a partition characteristic mismatching aspects of the current state of the client device, such that no match occurs between the partition characteristic and any aspect of the current state.

Where the current state of the client device corresponds to a current login credential received at the client device, in operation 728, the validation component 260 compares the current state of the client device with a previous login credential corresponding to a login credential associated with the precaching of the selected set of data elements. In operation 730, based on a mismatch between the current login credential and the previous login credential, the configuration component 250 discards at least a portion of the selected set of data elements. One or more of the selection component 230 and the configuration component 250 selects a subsequent set of data elements for precaching within the processor-readable storage device coupled to the client device.

Modules, Components, and Logic

Certain embodiments are described herein as including logic or a number of components, modules, or mechanisms. Components can constitute hardware components. A "hardware component" is a tangible unit capable of performing certain operations and can be configured or arranged in a certain physical manner. In various example embodiments, computer systems (e.g., a standalone computer system, a client computer system, or a server computer system) or hardware components of a computer system (e.g., at least one hardware processor, a processor, or a group of processors) is configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein. "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented components that operate to perform operations or functions described herein. As used herein, "processor-implemented component" refers to a hardware component implemented using processors.

Similarly, the methods described herein can be at least partially processor-implemented, with a particular processor or processors being an example of hardware. For example, at least some of the operations of a method can be performed by processors or processor-implemented components. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments, the processors or processor-implemented components are located in a single geographic location (e.g., within a home environment, an office environment, or a server farm). In other example embodiments, the processors or processor-implemented components are distributed across a number of geographic locations.

Applications

Figure 8:
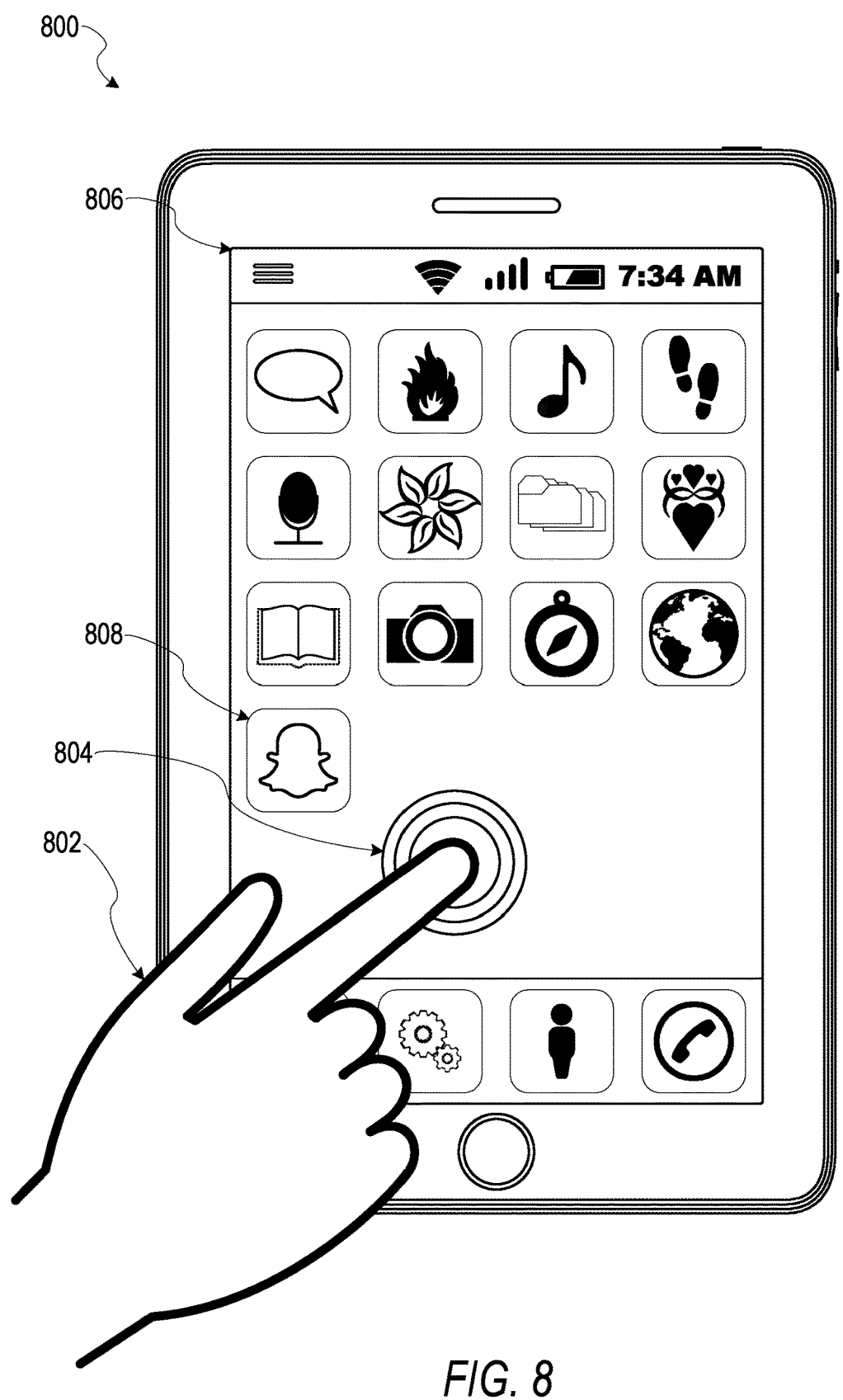
FIG. 8 is a user interface diagram depicting an example mobile device and mobile operating system interface, according to some example embodiments.

FIG. 8 illustrates an example mobile device 800 executing a mobile operating system (e.g., IOS™. ANDROID™, WINDOWS® Phone, or other mobile operating systems), consistent with some embodiments. In one embodiment, the mobile device 800 includes a touch screen operable to receive tactile data from a user 802. For instance, the user 802 may physically touch 804 the mobile device 800, and in response to the touch 804, the mobile device 800 may determine tactile data such as touch location, touch force, or gesture motion. In various example embodiments, the mobile device 800 displays a home screen 806 (e.g., Springboard on IOS™) operable to launch applications or otherwise manage various aspects of the mobile device 800. In some example embodiments, the home screen 806 provides status information such as battery life, connectivity, or other hardware statuses. The user 802 can activate user interface elements by touching an area occupied by a respective user interface element. In this manner, the user 802 interacts with the applications of the mobile device 800. For example, touching the area occupied by a particular icon included in the home screen 806 causes launching of an application corresponding to the particular icon.

The mobile device 800, as shown in FIG. 8, includes an imaging device 808. The imaging device 808 may be a camera or any other device coupled to the mobile device 800 capable of capturing a video stream or one or more successive images. The imaging device 808 may be triggered by the data distribution system 160 or a selectable user interface element to initiate capture of a video stream or succession of images and pass the video stream or succession of images to the data distribution system 160 for processing according to the one or more methods described in the present disclosure.

Many varieties of applications (also referred to as "apps") can be executing on the mobile device 800, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 800 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 800 includes a social messaging app 810 such as SNAPCHAT® that, consistent with some embodiments, allows users to exchange ephemeral messages that include media content. In this example, the social messaging app 810 can incorporate aspects of embodiments described herein. For example, in some embodiments the social messaging application includes an ephemeral gallery of media created by users the social messaging application. These galleries may consist of videos or pictures posted by a user and made viewable by contacts (e.g., "friends") of the user. Alternatively, public galleries may be created by administrators of the social messaging application consisting of media from any users of the application (and accessible by all users). In yet another embodiment, the social messaging application may include a "magazine" feature which consists of articles and other content generated by publishers on the social messaging application's platform and accessible by any users. Any of these environments or platforms may be used to implement concepts of the present inventive subject matter.

In some embodiments, an ephemeral message system may include messages having ephemeral video clips or images which are deleted following a deletion trigger event such as a viewing time or viewing completion. In such embodiments, a device implementing the data distribution system 160 may selectively partitioning and precaching data elements within the ephemeral message, and transmit the ephemeral message to another device using the ephemeral message system.

Software Architecture

Figure 9:
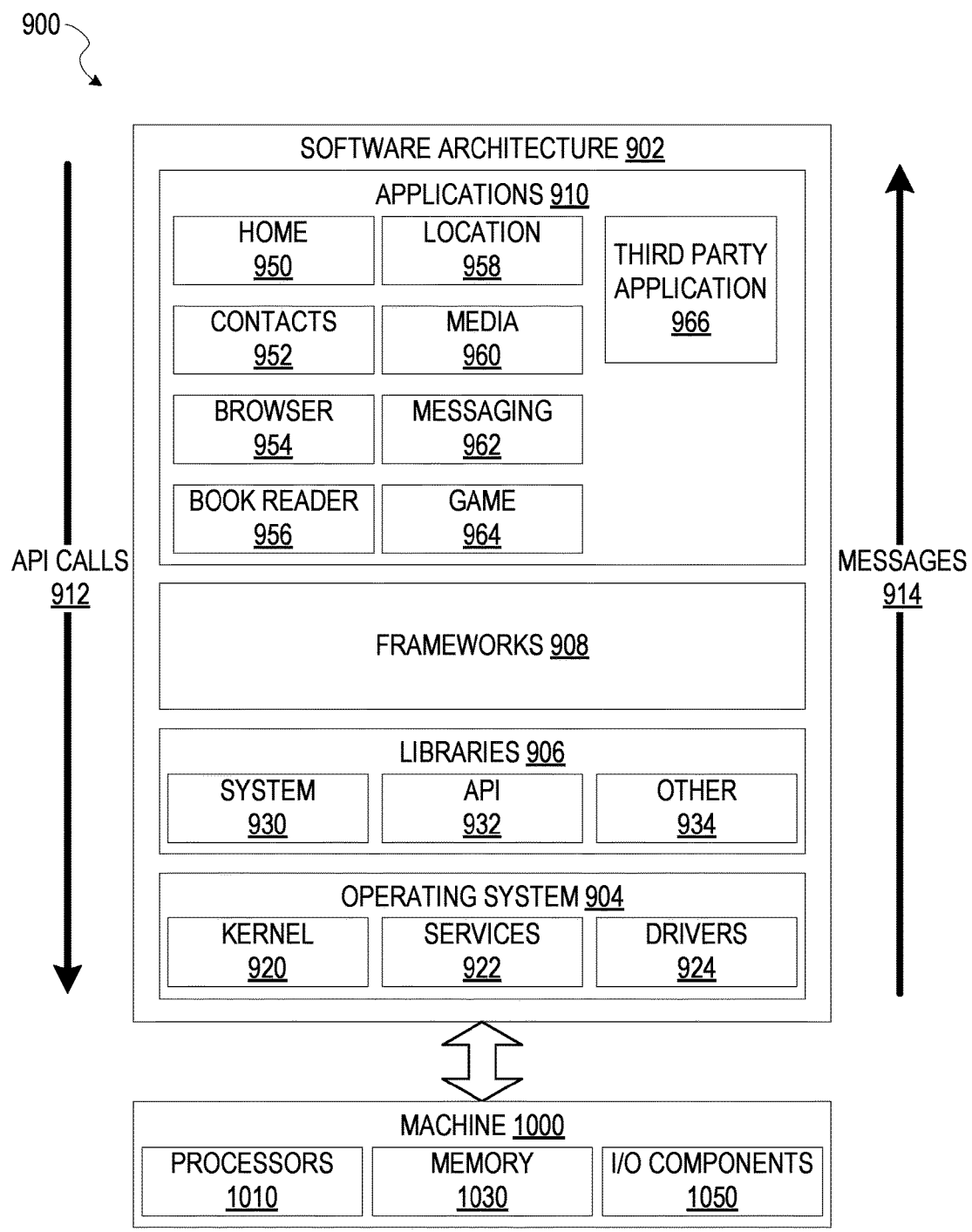
FIG. 9 is a block diagram illustrating an example of a software architecture that may be installed on a machine, according to some example embodiments.

FIG. 9 is a block diagram 900 illustrating an architecture of software 902, which can be installed on the devices described above. FIG. 9 is merely a non-limiting example of a software architecture, and it will be appreciated that many other architectures can be implemented to facilitate the functionality described herein. In various embodiments, the software 902 is implemented by hardware such as machine a 1000 of FIG. 10 that includes processors 1010, memory 1030, and I/O components 1050. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers consistent with some embodiments.

For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC). Moving Picture Experts Group Layer-3 (MP3). Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third party application 966. According to some embodiments, the applications 910 are programs that execute functions defined in the programs. Various programming languages can be employed to create the applications 910, structured in a variety of manners, such as object-oriented programming languages (e.g., Objective-C. Java, or C++) or procedural programming languages (e.g., C or assembly language). In a specific example, the third party application 966 (e.g., an application developed using the ANDROID™ or IOS™ software development kit (SDK) by an entity other than the vendor of the particular platform) may be mobile software running on a mobile operating system such as IOS™, ANDROID™. WINDOWS® PHONE, or another mobile operating systems. In this example, the third party application 966 can invoke the API calls 912 provided by the operating system 904 to facilitate functionality described herein.

Example Machine Architecture and Machine-Readable Medium

Figure 10:
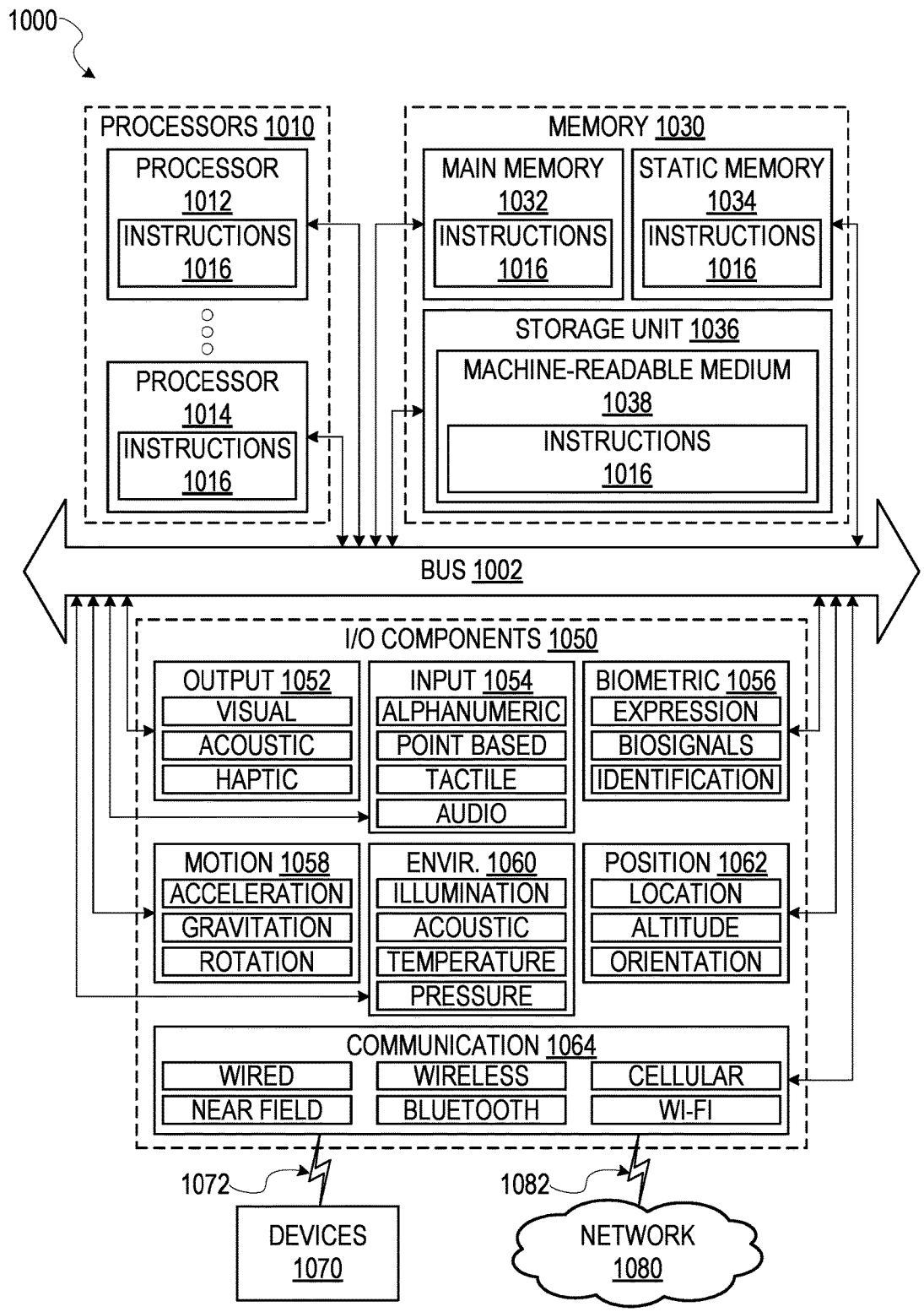
FIG. 10 is a block diagram presenting a diagrammatic representation of a machine in the form of a computer system within which a set of instructions may be executed for causing the machine to perform any of the methodologies discussed herein, according to an example embodiment.

FIG. 10 is a block diagram illustrating components of a machine 1000, according to some embodiments, able to read instructions (e.g., processor executable instructions) from a machine-readable medium (e.g., a non-transitory machine-readable storage medium) and perform any of the methodologies discussed herein. Specifically. FIG. 10 shows a diagrammatic representation of the machine 1000 in the example form of a computer system, within which instructions 1016 (e.g., software, a program, an application, an applet, an app, or other executable code) for causing the machine 1000 to perform any of the methodologies discussed herein can be executed. In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any of the methodologies discussed herein.

In various embodiments, the machine 1000 comprises processors 1010, memory 1030, and I/O components 1050, which can be configured to communicate with each other via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 1012 and a processor 1014 that may execute the instructions 1016. The term "processor" is intended to include multi-core processors that may comprise two or more independent processors (also referred to as "cores") that can execute instructions 1016 contemporaneously. Although FIG. 10 shows multiple processors 1010, the machine 1000 may include a single processor with a single core, a single processor with multiple cores (e.g., a multi-core processor), multiple processors with a single core, multiple processors with multiples cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium 1038 on which are stored the instructions 1016 embodying any of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown in an example embodiment to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by processors of the machine 1000 (e.g., processors 1010), cause the machine 1000 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 include output components 1052 and input components 1054. The output components 1052 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1050 include biometric components 1056, motion components 1058, environmental components 1060, or position components 1062, among a wide array of other components. For example, the biometric components 1056 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 include acceleration sensor components (e.g., accelerometer), gravitation sensor components, rotation sensor components (e.g., gyroscope), and so forth. The environmental components 1060 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, communication components 1064 include wired communication components, wireless communication components, cellular communication components, Near Field Communication (NFC) components. BLUETOOTH® components (e.g., BLUETOOTH® Low Energy), WI-FI® components, and other communication components to provide communication via other modalities. The devices 1070 may be another machine or any of a wide variety of peripheral devices (e.g., a peripheral device coupled via a Universal Serial Bus (USB)).

Moreover, in some embodiments, the communication components 1064 detect identifiers or include components operable to detect identifiers. For example, the communication components 1064 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code. Data Matrix, Dataglyph. MaxiCode, PDF417, Ultra Code. Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geo-location, location via WI-FI® signal triangulation, location via detecting a BLUETOOTH® or NFC beacon signal that may indicate a particular location, and so forth.

Transmission Medium

In various example embodiments, portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or another type of cellular or wireless coupling. In this example, the coupling 1082 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS). High Speed Packet Access (HSPA). Worldwide Interoperability for Microwave Access (WiMAX), Long Term Evolution (LTE) standard, others defined by various standard-setting organizations, other long range protocols, or other data transfer technology.

In example embodiments, the instructions 1016 are transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, in other example embodiments, the instructions 1016 are transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Furthermore, the machine-readable medium 1038 is non-transitory (in other words, not having any transitory signals) in that it does not embody a propagating signal. However, labeling the machine-readable medium 1038 "non-transitory" should not be construed to mean that the medium is incapable of movement; the medium should be considered as being transportable from one physical location to another. Additionally, since the machine-readable medium 1038 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
   identifying, by one or more processors, a device context for a client device, wherein the device context includes a current time or a current location associated with the client device;
   identifying a cell based on the device context, the cell being associated with one or more partition characteristics and a plurality of data elements corresponding to the one or more partition characteristics, wherein the data elements are stored in a precache of data elements, wherein one or more partition characteristics comprises an event, a specified establishment, a geographical formation, or a weather event;
   selecting a set of data elements corresponding to the cell;
   retrieving a set of precached data elements, wherein the set of precached data elements include the selected set of data elements retrieved from the precache of data elements stored on a processor-readable storage device coupled to the client device;
   causing the selected set of data elements to be displayed as selectable user interface elements on a display device coupled to the client device;
   receiving a selection of a first selectable user interface element included in the selectable user interface elements, wherein the first selectable user interface element is associated with a first precached data element corresponding to a first partition characteristic;

modifying an image, captured using a camera coupled to the client device, based on the selection of the selectable user interface element to generate a modified image, wherein the modified image includes an overlay that identifies the first partition characteristic; and causing the modified image to be displayed on the display device coupled to the client device.

2. The method of claim 1 further comprising:

dynamically partitioning an area into a set of cells, each cell of the set of cells corresponding to at least one partition characteristic of a plurality of partition characteristics;

selecting at least a portion of the plurality of data elements for association with at least one cell of the set of cells; and associating the at least one partition characteristic with each data element of the portion of the plurality of data elements, the at least one partition characteristic associated with a data element being the at least one partition characteristic for the at least one cell with which the data element is associated.

3. The method of claim 2, wherein dynamically partitioning the area further comprises:

identifying a geographic area;

determining a data element density distributed across the geographic area, the data element density being based on a number of data elements, of the plurality of data elements, to be distributed across the geographic area; and generating the set of cells such that each cell is associated with an equal number of data elements of the plurality of data elements.

4. The method of claim 3, wherein dynamically partitioning the area further comprises:

determining a data element capacity for the client device;

determining the data element density based on the number of data elements to be distributed across the geographic area and the data element capacity of the client device; and generating the set of cells such that each cell is associated with an equal number of data elements and the equal number of data elements for each cell being below the data element capacity of the client device.

5. The method of claim 1 further comprising:

identifying a partition characteristic corresponding to a current state of the client device; and validating the selected set of data elements based on the current state of the client device.

6. The method of claim 5, wherein the current state of the client device corresponds to one or more of a location of the client device and a time, and wherein validating the selected set of data elements further comprises:

comparing the current state of the client device with the portion of the partition characteristics corresponding to the selected set of data elements; and based on a match between the current state of the client device and the portion of the partition characteristics, retaining at least a portion of the selected set of data elements in the processor-readable storage device coupled to the client device.

7. The method of claim 5, wherein the current state of the client device corresponds to one or more of a location of the client device and a time, and wherein validating the selected set of data elements further comprises:

comparing the current state of the client device with the portion of the partition characteristics corresponding to the selected set of data elements; and based on a mismatch between the current state of the client device and the portion of the partition characteristics, discarding at least a portion of the selected set of data elements and selecting a subsequent set of data elements for precaching within the processor-readable storage device coupled to the client device.

8. The method of claim 5, wherein the current state of the client device corresponds to a current login credential received at the client device, wherein validating the selected set of data elements further comprises:

comparing the current state of the client device with a previous login credential corresponding to a login credential associated with the precaching of the selected set of data elements; and based on a mismatch between the current login credential and the previous login credential discarding at least a portion of the selected set of data elements and selecting a subsequent set of data elements for precaching within the processor-readable storage device coupled to the client device.

9. The method of claim 1 further comprising:

identifying a partition characteristic of the one or more partition characteristics, the partition characteristic corresponding to a current state of the client device; and in response to an access request at the client device, causing presentation of at least one data element of the selected set of data elements at a display device coupled to the client device, the at least one data element being associated with the partition characteristic.

10. A system, comprising:

one or more processors; and a processor-readable storage device coupled to the one or more processors, the processor-readable storage device storing processor executable instructions that, when executed by the one or more processors, cause the one or more processors to perform operations comprising:

identifying, by one or more processors, a device context for a client device, wherein the device context includes a current time or a current location associated with the client device;

identifying a cell based on the device context, the cell being associated with one or more partition characteristics and a plurality of data elements corresponding to the one or more partition characteristics, wherein the data elements stored in a precache of data elements, wherein one or more partition characteristics comprises an event, a specified establishment, a geographical formation, or a weather event;

selecting a set of data elements corresponding to the cell;

retrieving a set of precached data elements, wherein the set of precached data elements include the selected set of data elements retrieved from the precache of data elements stored on a processor-readable storage device coupled to the client device;

causing the selected set of data elements to be displayed as selectable user interface elements on a display device coupled to the client device receiving a selection of a first selectable user interface element included in the selectable user interface elements, wherein the first selectable user interface element is associated with a first precached data element corresponding to a first partition characteristic;

modifying an image captured using a camera coupled to the client device, based on the selection of the selectable user interface element to generate a modified image, wherein the modified image includes an overlay that identifies the first partition characteristic; and causing the modified image to be displayed on the display device coupled to the client device.

11. The system of claim 10, wherein the operations further comprise:

dynamically partitioning an area into a set of cells, each cell of the set of cells corresponding to at least one partition characteristic of a plurality of partition characteristics;

selecting at least a portion of the plurality of data elements for association with at least one cell of the set of cells; and associating the at least one partition characteristic with each data element of the portion of the plurality of data elements, the at least one partition characteristic associated with a data element being the at least one partition characteristic for the at least one cell with which the data element is associated.

12. The system of claim 11, wherein dynamically partitioning the area further comprises:

identifying a geographic area;

determining a data element density distributed across the geographic area, the data element density being based on a number of data elements, of the plurality of data elements, to be distributed across the geographic area; and generating the set of cells such that each cell is associated with an equal number of data elements of the plurality of data elements.

13. The system of claim 12, wherein dynamically partitioning the area further comprises:

determining a data element capacity for the client device;

determining the data element density based on the number of data elements to be distributed across the geographic area and the data element capacity of the client device; and generating the set of cells such that each cell is associated with an equal number of data elements and the equal number of data elements for each cell being below the data element capacity of the client device.

14. The system of claim 10, wherein the operations further comprise:

identifying a partition characteristic corresponding to a current state of the client device; and validating the selected set of data elements based on the current state of the client device.

15. The system of claim 10, wherein the operations further comprise:

identifying a partition characteristic of the one or more partition characteristics, the partition characteristic corresponding to a current state of the client device; and in response to an access request at the client device, causing presentation of at least one data element of the selected set of data elements at a display device coupled to the client device, the at least one data element being associated with the partition characteristic.

16. A processor-readable storage device coupled to the one or more processors, the processor-readable storage device storing processor executable instructions that, when executed by the one or more processors, cause the one or more processors to perform operations comprising:

identifying, by one or more processors, a device context for a client device, wherein the device context includes a current time or a current location associated with the client device;

identifying a cell based on the device context, the cell being associated with one or more partition characteristics and a plurality of data elements corresponding to the one or more partition characteristics, wherein the data elements stored in a precache of data elements, wherein one or more partition characteristics comprises an event, a specified establishment, a geographical formation, or a weather event;

selecting a set of data elements corresponding to the cell;

retrieving a set of precached data elements, wherein the set of precached data elements include the selected set of data elements retrieved from the precache of data elements stored on a processor-readable storage device coupled to the client device;

causing the selected set of data elements to be displayed as selectable user interface elements on a display device coupled to the client device receiving a selection of a first selectable user interface element included in the selectable user interface elements, wherein the first selectable user interface element is associated with a first precached data element corresponding to a first partition characteristic;

modifying an image captured using a camera coupled to the client device, based on the selection of the selectable user interface element to generate a modified image, wherein the modified image includes an overlay that identifies the first partition characteristic; and causing the modified image to be displayed on the display device coupled to the client device.

17. The processor-readable storage device of claim 16, wherein the operations further comprise:

dynamically partitioning an area into a set of cells, each cell of the set of cells corresponding to at least one partition characteristic of a plurality of partition characteristics;

selecting at least a portion of the plurality of data elements for association with at least one cell of the set of cells; and associating the at least one partition characteristic with each data element of the portion of the plurality of data elements, the at least one partition characteristic associated with a data element being the at least one partition characteristic for the at least one cell with which the data element is associated.

18. The processor-readable storage device of claim 17, wherein dynamically partitioning the area further comprises:

identifying a geographic area;

determining a data element density distributed across the geographic area, the data element density being based on a number of data elements, of the plurality of data elements, to be distributed across the geographic area; and generating the set of cells such that each cell is associated with an equal number of data elements of the plurality of data elements.

19. The processor-readable storage device of claim 18, wherein dynamically partitioning the area further comprises:

determining a data element capacity for the client device;

determining the data element density based on the number of data elements to be distributed across the geographic area and the data element capacity of the client device; and generating the set of cells such that each cell is associated with an equal number of data elements and the equal number of data elements for each cell being below the data element capacity of the client device.

20. The processor-readable storage device of claim 16, wherein the operations further comprise:
identifying a partition characteristic corresponding to a current state of the client device; and
validating the selected set of data elements based on the current state of the client device.

* * * * *

UNITED STATES PATENT AND TRADEMARK OFFICE
CERTIFICATE OF CORRECTION

| | | |
|---|---|---|
| PATENT NO. | : 10,467,147 B1 | Page 1 of 1 |
| APPLICATION NO. | : 15/582304 | |
| DATED | : November 5, 2019 | |
| INVENTOR(S) | : Ahmed et al. | |

It is certified that error appears in the above-identified patent and that said Letters Patent is hereby corrected as shown below:

In the Claims

Column 32, Line 20, Claim 8, after "credential", insert --,--

Column 32, Line 62, in Claim 10, after "device", insert --;--

Column 33, Line 1, in Claim 10, after "image", insert --,--

Column 34, Line 22, Claim 16, after "device", insert --;--

Column 34, Line 28, Claim 16, after "image", insert --,--

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*